United States Patent
Malinowski et al.

(10) Patent No.: US 10,614,424 B1
(45) Date of Patent: Apr. 7, 2020

(54) ASSISTED CREATION FOR TIME BASED EVENTS

(71) Applicant: GOOGLE INC, Mountain View, CA (US)

(72) Inventors: Piotr Malinowski, Zurich (CH); Michael Hatscher, Zurich (CH); Paul Derek Hankin, Zurich (CH); Robin Züger, Zurich (CH); Ibrahim Badr, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 653 days.

(21) Appl. No.: 14/470,668

(22) Filed: Aug. 27, 2014

(51) Int. Cl.
    *G06Q 10/00*     (2012.01)
    *G06Q 10/10*     (2012.01)

(52) U.S. Cl.
    CPC ............... *G06Q 10/1095* (2013.01)

(58) Field of Classification Search
    CPC ............ G06Q 10/06311; G06Q 10/06314
    See application file for complete search history.

(56) References Cited

U.S. PATENT DOCUMENTS

| | | | |
|---|---|---|---|
| 8,713,042 B1 | 4/2014 | Zinenko et al. | |
| 2008/0300944 A1* | 12/2008 | Surazski | G06Q 10/06311 705/7.13 |
| 2009/0204609 A1 | 8/2009 | Labrou et al. | |
| 2009/0259636 A1 | 10/2009 | Labrou et al. | |
| 2011/0231409 A1* | 9/2011 | Dhara | H04L 12/1818 707/748 |
| 2012/0136689 A1 | 5/2012 | Ickman et al. | |
| 2013/0151533 A1 | 6/2013 | Udupa et al. | |
| 2013/0298043 A1 | 11/2013 | Bailey | |
| 2013/0332525 A1 | 12/2013 | Liu et al. | |
| 2014/0171129 A1* | 6/2014 | Benzatti | H04W 4/025 455/457 |
| 2015/0058425 A1* | 2/2015 | Nathan | H04L 65/403 709/206 |
| 2015/0347980 A1* | 12/2015 | White | G06Q 10/1095 705/7.19 |

* cited by examiner

*Primary Examiner* — William S Brockington, III
*Assistant Examiner* — Scott M Ross
(74) *Attorney, Agent, or Firm* — Brake Hughes Bellermann LLP

(57) ABSTRACT

Provided are methods and systems for creating events in a calendar application by providing a user with a suggestion service (e.g., tool, function, etc.) for entering various details about the events. The event creation suggestion service is designed to provide the user with a single-box suggestion-like experience that allows the user to quickly and easily enter information about an event (e.g., event title, event location, event date and/or start/end time, contacts to be associated with the event, etc.). With each keystroke a user may be given a set of suggestions (e.g., auto-completions) to choose from. In this manner, the user may create detailed events by typing in one box as if the user is only entering the title for the event, and selecting from relevant suggestions that are provided.

11 Claims, 23 Drawing Sheets

ASSISTED CREATION FOR TIME BASED EVENTS

BACKGROUND

Conventional calendar client applications typically implement an event creation flow by presenting a user with a form containing many different fields representing different event details (e.g., event title, event start/end times, event location, guests, etc.). While such a form may allow users to enter many of the necessary details for the event, most users only specify partial information (e.g., event title and start time) for the event, and presenting users with such a comprehensive form often makes them feel overwhelmed.

SUMMARY

This Summary introduces a selection of concepts in a simplified form in order to provide a basic understanding of some aspects of the present disclosure. This Summary is not an extensive overview of the disclosure, and is not intended to identify key or critical elements of the disclosure or to delineate the scope of the disclosure. This Summary merely presents some of the concepts of the disclosure as a prelude to the Detailed Description provided below.

The present disclosure generally relates to methods and systems for providing web and mobile application services to users. More specifically, aspects of the present disclosure relate to providing users with assisted creation for time-based events.

One embodiment of the present disclosure relates to a computer-implemented method for creating time-based events comprising: detecting user input in an event creation field for entering data about an event; determining, based on the user input, one or more suggestions for the data about the event; displaying the one or more suggestions for selection, wherein the one or more suggestions are displayed according to a type of data associated with each of the suggestions; receiving a selection of one of the displayed suggestions; and adding the selected suggestion to the event creation field as the data about the event.

In another embodiment, the method for creating time-based events further comprises determining, based on the suggestion added to the event creation field, at least one other suggestion for the data about the event, and displaying the at least one other suggestion for selection by the user.

In another embodiment, the method for creating time-based events further comprises receiving from the user a selection of the at least one other suggestion, and adding the selected at least one other suggestion to the event creation field as additional data about the event.

In yet another embodiment, determining one or more suggestions for the data about the event in the method for creating time-based events includes: determining that the user input matches one or more templates for entering data about an event; and displaying the one or more templates for selection, wherein the one or more templates are displayed according to a rank assigned to each of the templates.

In still another embodiment, the method for creating time-based events further comprises: prompting the user to enter data about a first component of the event; generating, based on data entered by the user, one or more suggestions for the first component of the event; receiving a selection of a suggestion from the one or more suggestions generated for the first component of the event; adding the selected suggestion as the first component of the event; and generating, based on the selected suggestion for the first component of the event, one or more suggestions for a second component of the event, the second component of the event being different than the first component.

Another embodiment of the present disclosure relates to a system for creating time-based events, the system comprising one or more processors and a non-transitory computer-readable medium coupled to the one or more processors having instructions stored thereon that, when executed by the one or more processors, cause the one or more processors to perform operations comprising: detecting user input in an event creation field for entering data about an event; determining, based on the user input, one or more suggestions for the data about the event; displaying the one or more suggestions for selection, wherein the one or more suggestions are displayed according to a type of data associated with each of the suggestions; receiving a selection of one of the displayed suggestions; and adding the selected suggestion to the event creation field as the data about the event.

In another embodiment, the one or more processors in the system for creating time-based events are caused to perform further operations comprising determining, based on the suggestion added to the event creation field, at least one other suggestion for the data about the event, and displaying the at least one other suggestion for selection by the user.

In another embodiment, the one or more processors in the system for creating time-based events are caused to perform further operations comprising receiving from the user a selection of the at least one other suggestion, and adding the selected at least one other suggestion to the event creation field as additional data about the event.

In yet another embodiment, the one or more processors in the system for creating time-based events are caused to perform further operations comprising determining that the user input matches one or more templates for entering data about an event; and displaying the one or more templates for selection, wherein the one or more templates are displayed according to a rank assigned to each of the templates.

In still another embodiment, the one or more processors in the system for creating time-based events are caused to perform further operations comprising: prompting the user to enter data about a first component of the event; generating, based on data entered by the user, one or more suggestions for the first component of the event; receiving a selection of a suggestion from the one or more suggestions generated for the first component of the event; adding the selected suggestion as the first component of the event; and generating, based on the selected suggestion for the first component of the event, one or more suggestions for a second component of the event, the second component of the event being different than the first component.

Yet another embodiment of the present disclosure relates to one or more non-transitory computer readable media storing computer-executable instructions that, when executed by one or more processors, causes the one or more processors to perform operations comprising: detecting user input in an event creation field for entering data about an event; determining, based on the user input, one or more suggestions for the data about the event; displaying the one or more suggestions for selection, wherein the one or more suggestions are displayed according to a type of data associated with each of the suggestions; receiving a selection of one of the displayed suggestions; adding the selected suggestion to the event creation field as the data about the event; determining, based on the suggestion added to the event creation field, at least one other suggestion for the data about the event; and displaying the at least one other suggestion for selection.

In one or more other embodiments, the methods and systems described herein may optionally include one or more of the following additional features: the suggestions include one or more of: a title for the event, a location associated with the event, a date and/or time associated with the event, and a contact associated with the event; each of the suggestions is for one of: a title for the event, a location associated with the event, a date and/or time associated with the event, and a contact associated with the event; each of the one or more suggestions includes a placeholder for a contact associated with the event; each of the one or more suggestions includes a placeholder for a location associated with the event; each of the one or more suggestions includes a placeholder for a date and/or time associated with the event; each of the one or more suggestions includes a placeholder for a contact associated with the event, a placeholder for a location associated with the event, or both; and/or the first component and the second component are each a different one of: a title for the event, a location associated with the event, a date and/or time associated with the event, and a contact associated with the event.

Further scope of applicability of the present disclosure will become apparent from the Detailed Description given below. However, it should be understood that the Detailed Description and specific examples, while indicating preferred embodiments, are given by way of illustration only, since various changes and modifications within the spirit and scope of the disclosure will become apparent to those skilled in the art from this Detailed Description.

BRIEF DESCRIPTION OF DRAWINGS

These and other objects, features and characteristics of the present disclosure will become more apparent to those skilled in the art from a study of the following Detailed Description in conjunction with the appended claims and drawings, all of which form a part of this specification. In the drawings:

Figure 1:
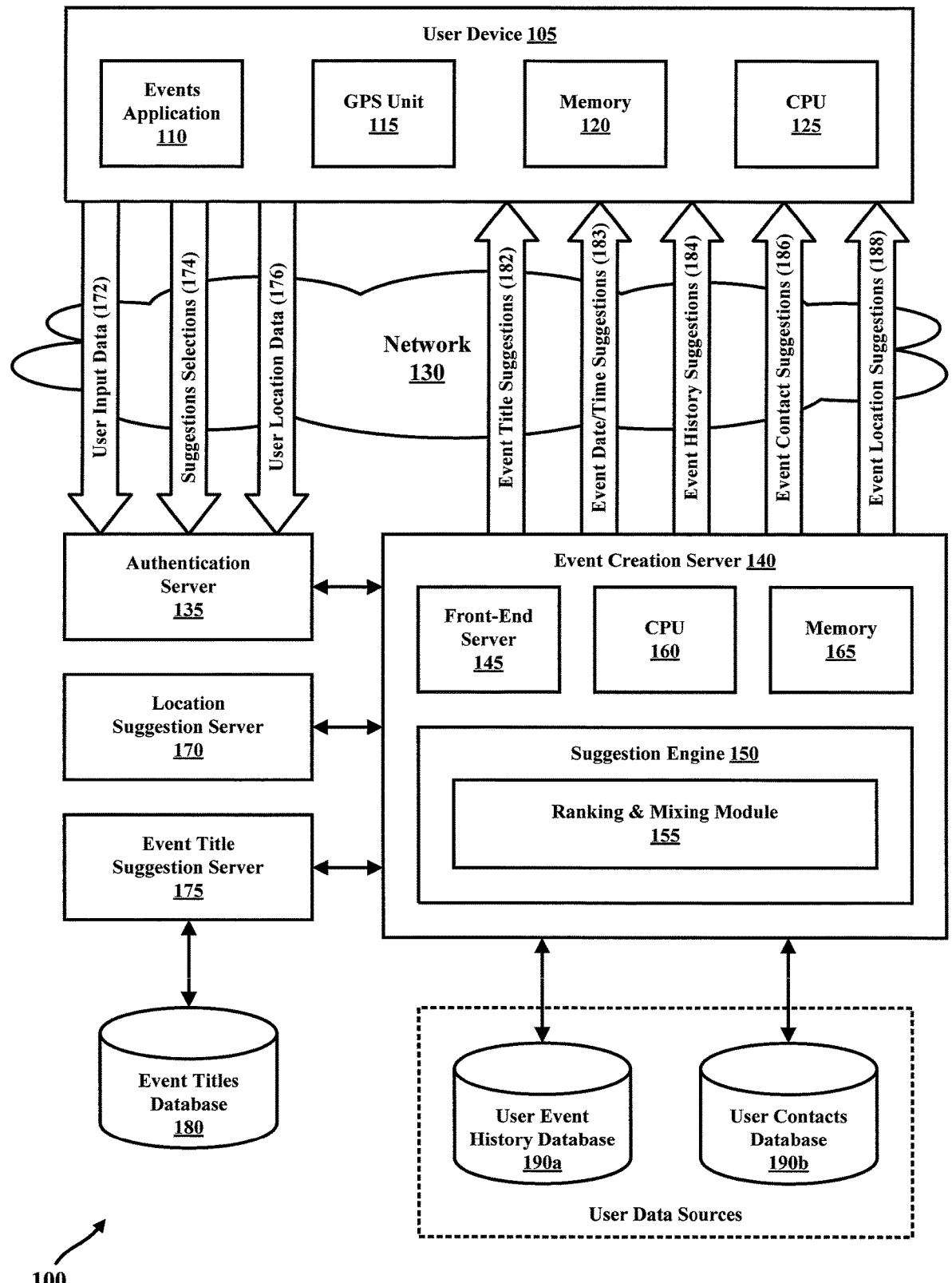
FIG. 1 is a block diagram illustrating an example system for providing a user with an event creation suggestion service for entering details about an event according to one or more embodiments described herein.

The headings provided herein are for convenience only and do not necessarily affect the scope or meaning of what is claimed in the present disclosure.

In the drawings, the same reference numerals and any acronyms identify elements or acts with the same or similar structure or functionality for ease of understanding and convenience. The drawings will be described in detail in the course of the following Detailed Description.

DETAILED DESCRIPTION

Various examples and embodiments will now be described. The following description provides specific details for a thorough understanding and enabling description of these examples. One skilled in the relevant art will understand, however, that one or more embodiments described herein may be practiced without many of these details. Likewise, one skilled in the relevant art will also understand that one or more embodiments of the present disclosure can include many other obvious features not described in detail herein. Additionally, some well-known structures or functions may not be shown or described in detail below, so as to avoid unnecessarily obscuring the relevant description.

Embodiments of the present disclosure relate to methods and systems for providing users with assistance for creating time-based events. As will be described in greater detail below, a user may be provided with a suggestion service (e.g., tool, function, etc.) for entering various details about any of a variety of time-based events (e.g., calendar events, tasks, etc.). The event creation suggestion service of the present disclosure is designed to provide the user with a single-box suggestion-like experience that allows the user to quickly and easily enter information about an event (e.g., event title, event location, event start/end time, contacts to be associated with the event, etc.). In accordance with at least one embodiment described herein, with each keystroke (e.g., on a digital keyboard provided for display on a user device such as, for example, a cellular telephone, smartphone, etc.) a user may be given a set of suggestions (e.g., auto-completions) to choose from. In this manner, a user may create detailed events by typing in one box (e.g., as if the user is only entering the title for the event) and selecting from relevant suggestions that are provided.

It should be noted that in accordance with one or more embodiments, the suggestions provided to a user may be of different types or categories from one another, and may relate to entities other than data components typically associated with an event including, for example, documents, attachments, recurrence settings, notification timers, as well as any other types of suggestions deemed relevant to what the user is inputting (e.g., typing).

The methods and systems of the present disclosure are designed to make the process of creating events faster and more efficient for the user while also encouraging the user to enter more structured data (e.g., contacts, locations, etc.). As will be further described herein, the event creation suggestion service of the present disclosure makes creating or editing an event (e.g., a calendar event) into an incremental process whereby a user types in some details about the event, accepts a relevant suggestion (e.g., a location for the event, a contact to associate with the event, etc.), and continues typing to specify additional details (and also possibly triggering one or more other suggestions). Among numerous other advantages, the methods and systems described herein make the title field (e.g., the data entry field for entering a title for an event) in an event creation/edit mode more powerful by providing suggestions for titles, locations, contacts, dates, times, as well as numerous other data and/or content entities determined to be relevant to input from the user.

The methods and systems of the present disclosure may be implemented as a suggestion service that takes user-entered text as an input and provides a set of suggestions representing various event details. In accordance with one or more embodiments of the present disclosure, the suggestion functionality used by an event creation server (e.g., Event Creation Server 140 in the example system 100 shown in FIG. 1, the details of which are further described herein) may include one or more components configured for particular suggestion of event details.

FIG. 1 illustrates an example system 100 and surrounding environment in which one or more embodiments described herein may be implemented. For example, system 100 may be used for providing a suggestion service during creation and/or editing of a time-based event (e.g., a calendar event). The example system and environment shown includes User Device 105, Event Creation Server 140, Authentication Server 135, Location Suggestion Server 170, and Event Title Suggestion Server 175. The example environment also includes a network 130, such as a local area network (LAN), a wide area network (WAN), the Internet, or a combination thereof. The network 100 connects User Device 105, Event Creation Server 140, Authentication Server 135, and can also connect additional devices and/or servers of the same or different type (not shown).

In accordance with one or more embodiments described herein, Event Creation Server 140 may include a Front-End Server 145, CPU 160, Memory 165, and Suggestion Engine 150, and may be configured to generate suggestions for a user to quickly and easily enter information about a time-based event (e.g., event title, event location, event start/end time, contacts to be associated with the event, etc.).

Event Creation Server 140 (which may sometimes be referred to herein as the "Quick Create Server") may be configured to act as mixer of suggestions generated from different sources. For example, in accordance with at least one embodiment, the Suggestion Engine 150 of the Event Creation Server 140 may include Ranking & Mixing Module 155, which may be configured to determine relevant candidate suggestions and order (e.g., prioritize, rank, or otherwise organize) such suggestions based on one or more parameters, rules, etc. For example, Ranking & Mixing Module 155 may use data obtained (e.g., retrieved, received, etc.) from Location Suggestion Server 170, Event Title Suggestion Server 175 (which may be configured to store template event titles in one or more databases such as Event Titles Database 180), User Event History Database 190a, User Contacts Database 190b, or some combination thereof, to sort candidate suggestions according to, for example, type of suggestion (e.g., title, date/time, location, contact, etc.), strength of relevancy of the suggestion (e.g., which may be determined based on frequency of use by the particular user and/or other users), and/or any other user preferences or settings configured by the user (e.g., only provide suggestions for event locations, do not provide contact suggestions, etc.).

In accordance with at least one embodiment, Event Creation Server 140 may support the following non-exhaustive list of types of suggestions: (i) templates, which may be based on frequent titles of events; (ii) connector terms; (iii) people, which may be based on a user's contacts; (iv) locations, which may be based on a maps database and may also be based on stored location data for the user (provided that user has consented to such stored data); (v) dates and/or times; and (vi) personal history suggestions.

Event Title Suggestions (182). This type of suggestion is intended to assist the user in creating events with commonly or frequently used titles (e.g., "Dinner", "Tennis game", "Yoga", etc.). In accordance with one or more embodiments, the Event Title Suggestions (182) may be based on event titles commonly or frequently used by some or all users of the calendar application 110. For example, the pool of candidate (e.g., supported, available, etc.) event titles that may be utilized to generate Event Title Suggestions (182) may be mined from existing events stored in a calendar backend or database (not shown). In accordance with at least one embodiment, the user's input (e.g., user input data (174)) may be matched against this pool in order to find the most relevant frequent titles (if any). In accordance with one or more other embodiments, Event Title Suggestions (182) may be based on various other data associated with existing events, including, for example, contacts associated with events, locations for events, dates and/or times of events, and the like.

Event Date/Time Suggestions (183). In accordance with one or more embodiments described herein, date and/or time suggestions may be provided for an event being created by a user, where the date and/or time suggestions may be generated by parsing out relevant data from the user's input (e.g., in the event creation field), may be based on date/time data associated with existing and/or past events of the user, or some combination thereof. For example, while a user is entering data about an event, the entered data may be parsed to determine relevant date (e.g., June 16, next Tuesday) and/or time (e.g., 3:00 PM) suggestions to provide to the user.

Event History Suggestions (184). In accordance with at least one embodiment, Event History Suggestions (184) may include suggestions based on a user's personal event history (e.g., based on the events that are already present in the user's personal calendar). For example, event titles that occurred previously in a user's calendar may be used as suggestions. Some non-limiting examples of Event History Suggestions (184) may include "Babysit Julia", "piano practice for the contest", "change to winter tires", etc.

In accordance with one or more embodiments of the present disclosure, user input data (172), suggestions selections (174), user location data (176), and/or various other data associated with a user may be utilized to provide the user with suggestions corresponding to an event being created by the user (e.g., in the user's calendar application). Such user input data and/or location data associated with the user may be received (e.g., at an Event Creation Server 150, as will be described in greater detail below) from any one or more of a variety of user devices 105 of the user (e.g., belonging to, authorized for use by, or otherwise associated with the user), and the various suggestions (e.g., Event Title Suggestions (182), Event Date/Time Suggestions (183), Event History Suggestions (184), Event Contact Suggestions (186), and/or Event Location Suggestions (188)) may be provided to any one or more of the same or different such user devices 105 for presentation to the user.

In accordance with at least one embodiment, User Device 105 may include Events Application 110, GPS Unit 115, Memory 120, and CPU 125. Examples of such user devices include laptop computers, tablet computing devices, mobile telephones, smartphones, wearable user computing devices (e.g., wristwatch or glasses configured as computing devices), as well as numerous other types or variations of such devices similar in nature and/or functionality.

Events Application 110 may consist of software that runs on the User Device 105 and performs certain functions or tasks for the user, such as, for example, providing user interfaces for event creation services, providing various forms of assistance when using such event creation services, and the like. Events Application 110 may also be a mobile application consisting of software designed to run on a mobile user device, such as a cell phone or smartphone. In accordance with one or more embodiments, Events Application 110 may be, for example, a calendar application, task manager, or some other category or type of application in which a user may create and edit time-based events.

In accordance with at least one embodiment, the Events Application 110 (e.g., a client application, such as a calendaring application) may be configured to aggregate all of the event details accepted by the user and send the aggregated data back to the Event Creation Server 140 as part of Suggestions Selections (174). The Event Creation Server 140 may use the aggregated event data for suggestions ranking and filtering processes (e.g., by Ranking & Mixing Module 155 of Suggestion Engine 150).

It should be understood that, in accordance with one or more other embodiments of the present disclosure, one or more of Event Creation Server 140, Authentication Server 135, Location Suggestion Server 170, Event Title Suggestion Server, Event Titles Database 180, User Event History Database 190a, and User Contacts Database 190b, may be a component in a larger system or service for providing users with assistance in the creation of time-based events. For example, Event Creation Server 140 may be an independent component in such a larger system or may be a subcomponent within an independent component (not shown) of the system. Similarly, one or more of Front-End Server 145, Suggestion Engine 150, and Ranking & Mixing Module 155 may be separate and/or independent components of Event Creation Server 140. In addition, in accordance with one or more other embodiments of the present disclosure, one or more other components, modules, units, etc., may be included as part of the example system 100, in addition to or instead of those illustrated in FIG. 1. The names used to identify the various servers, databases, and other components in the example system 100 shown in FIG. 1 (e.g., "Suggestion Engine", "Event Title Suggestion Server", "Ranking & Mixing Module", etc.), as well as the data exchanged between such components (e.g., "Selection Suggestions", "Event History Suggestions", etc.) are exemplary in nature, and are not in any way intended to limit the scope of the present disclosure.

Figure 2:
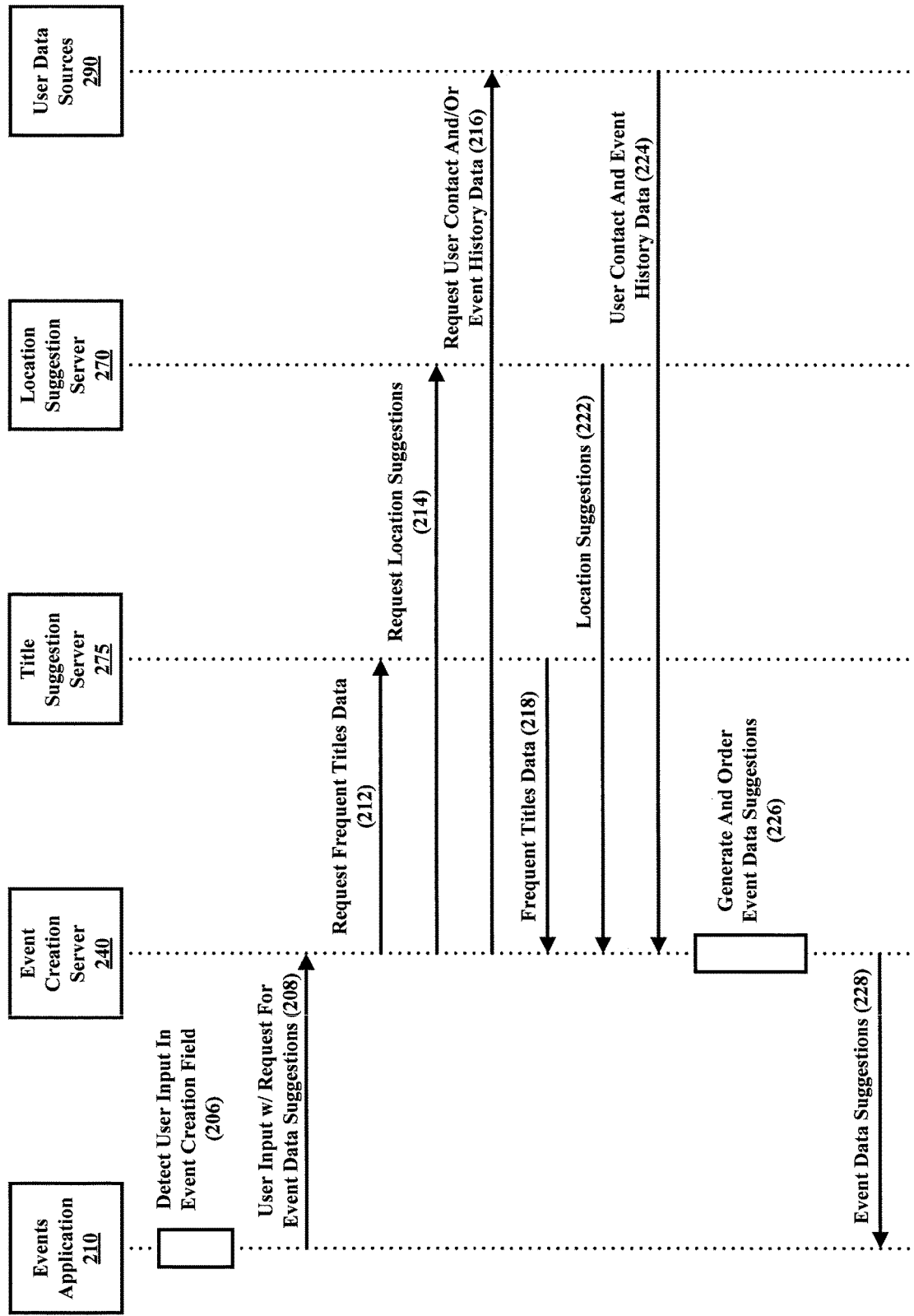
FIG. 2 is a schematic diagram illustrating example data flows between components of a system for providing a user with an event creation suggestion service for entering details about an event according to one or more embodiments described herein.

FIG. 2 illustrates example data flows between components of a system (e.g., system 100 shown in FIG. 1) for providing a user with an event creation suggestion service for entering data about an event. In accordance with at least one embodiment, Events Application 210, Event Creation Server 240, Title Suggestion Server 275, Location Suggestion Server 270, and User Data Sources 290 may be of similar structure and functionality as their corresponding components in the example system 100 illustrated in FIG. 1 and described in detail above.

As described above, one or more embodiments of the present disclosure relate to a suggestion service that takes input from a user during the creation of a time-based event and provides a set of suggestions representing various data components of the event based on the input. For example, input (e.g., text input) from a user (206) may be detected in an event creation field of an Events Application 210 (e.g., a calendar application, task-manager application, etc.), which may be installed on or accessed from, for example, a user device (e.g., user device 105 in the example system 100 shown in FIG. 1).

The detected input from the user may be sent with a request for event data suggestions (208) to an Event Creation Server 240. The Event Creation Server 240 may, based on the received user input and request for suggestions (208), send a request for frequent event titles data (212) to Title Suggestion Server 275, send a request for location suggestions (214) to Location Suggestion Server 270, and send one or more requests for user contact data and/or event history data (216) to one or more User Data Sources 290.

In response to sending the requests (212), (214), and (216), the Event Creation Server 240 may receive frequent titles data (218) from Title Suggestion Server 275, one or more location suggestions (222) from Location Suggestion Server 270, and user contact and/or event history data (224) from one or more of the User Data Sources 290.

In accordance with at least one embodiment described herein, the Event Creation Server 240 may use the received frequent titles data (218), location suggestions (222), user contact and/or event history data (224), as well as various other data (e.g., date/time data, not shown in FIG. 2) to generate one or more suggestions (226) for data about the event being created by the user. The Event Creation Server 240 may order (e.g., rank, prioritize, organize, etc.) the suggestions based on one or more criteria, preferences, settings, or the like, and send the ordered suggestions for event data (228) to the Events Application 210 for presentation to the user.

In accordance with at least one embodiment, the methods and systems of the present disclosure for providing event creation data suggestions to a user may include matching a query (e.g., text input such as, for example, one or more characters, numbers, punctuation, etc.) entered in an event creation field (e.g., data entry field) with one or more templates, as further described below.

Suggestions for one or more components (e.g., title, date and/or time, guests, etc.) of a time-based event (e.g., a calendar event, task, etc.) may be generated using a collection of templates. For example, when a user begins to type (e.g., enter characters such as letters, numbers, punctuation, etc.) in a data entry field for creating or editing an event, a list (e.g., index, database, etc.) of stored templates may be referenced (e.g., accessed) to determine whether the input from the user can be used to generate one or more suggestions for auto-completion of the data entry. In describing various embodiments, examples, and features of the present disclosure, data input (e.g., from a user) in the data entry field for creating/editing an event (e.g., the "event creation field" or the like) may be referred to as a "query". In accordance with at least one embodiment, in addition to or instead of the data input (e.g., text) by the user into the event creation field, a query may also include the user's location, language settings (e.g., the suggestion service of the present disclosure may be configured for multiple other languages besides English), current date/time, as well as numerous other types of input. The suggestion service described herein may detect a query in the data entry field for creating/editing an event and determine whether the query matches any of the stored templates. If any matches are determined, then one or more of the matched templates may be used to provide the user with one or more suggestions for completing the query.

In accordance with at least one embodiment described herein, template suggestions may be triggered while a user is typing in a data entry field for creating a new event or for editing an existing event. Furthermore, in accordance with one or more embodiments described herein, a template may be truncated before a contact, location, or date/time placeholder if the template is used as a suggestion to the user.

Suggestions of different types (e.g., contacts, locations, etc.) may be ranked and combined into a single list of results. In accordance with at least one embodiment described herein, the ranking and combining of relevant suggestions may be based on a set of logic rules (e.g., ranking and mixing logic), which may vary depending on the particular implementation, and/or may be based on one or more preferences of the user, settings configured for the user, and the like.

In describing various embodiments and features of the present disclosure, reference is sometimes made to event data "received from a user" and event data suggestions "provided to a user." It should be understood that in the implementation context, data and/or suggestions "received from a user" or "provided to a user" means data and/or suggestions received from/provided to a device of a user (e.g., User Device 105 in the example system 100 shown in FIG. 1), the device being configured for operation or use by the user. As such, data received from a user and data received from a user device, as well as suggestions provided to a user and suggestions provided to a user device, may be used interchangeably at times for purposes of simplicity.

Additionally, one or more examples provided herein describe providing suggestions for event data (e.g., details about an event) by displaying the suggestions in a "staging area" of an "event creation field". It should be noted that the terms "staging area" and "event creation field" are not in any way intended to limit the scope of the present disclosure. Rather, these terms are used herein as example descriptions of various areas of a user interface screen in which a user can create a new time-based event (e.g., a calendar event, a task, etc.). It should also be understood that, in accordance with one or more embodiments described herein, a calendar event associated with the user may be any time-based event associated with the user, and is not limited to an event scheduled only in a user's calendar application. For example, event data suggestions may be provided to a user for a task assigned to the user and stored in a task list associated with the user.

As will be described in greater detail herein, in generating and providing event component suggestions to a user, the location of the user may be determined (or approximated) using any of a variety of techniques and/or devices known in the art. For example, in accordance with at least one embodiment, a user's location may be determined using a global position system (GPS) associated with a device of the user, such as the user's mobile telephone, tablet computer, various wearable technologies or devices (e.g., articles of clothing or accessories incorporating or embedded with a computer and/or other electronic technologies, such as, for example, a wrist watch, glasses, etc.), and the like.

FIGS. 5a-5d, 6a-6f, 7a-7g, and 8 illustrate example user interfaces, some of which may be used in accordance with various embodiments of the present disclosure to implement one or more features of the example processes described below with respect to the data flow diagrams and flowcharts shown in FIGS. 2-4. Various aspects of the example user interface screens shown in FIGS. 5a-5d, 6a-6f, 7a-7g, and 8 may be referenced in the descriptions of the processes shown in FIGS. 2-4 for purposes of example and/or illustration. As such, the user interfaces shown in FIGS. 5a-5d, 6a-6f, 7a-7g, and 8 are at least partially described in the following paragraphs with additional details of some of the user interface screens being provided in the subsequent descriptions of FIGS. 2-4.

Figure 3:
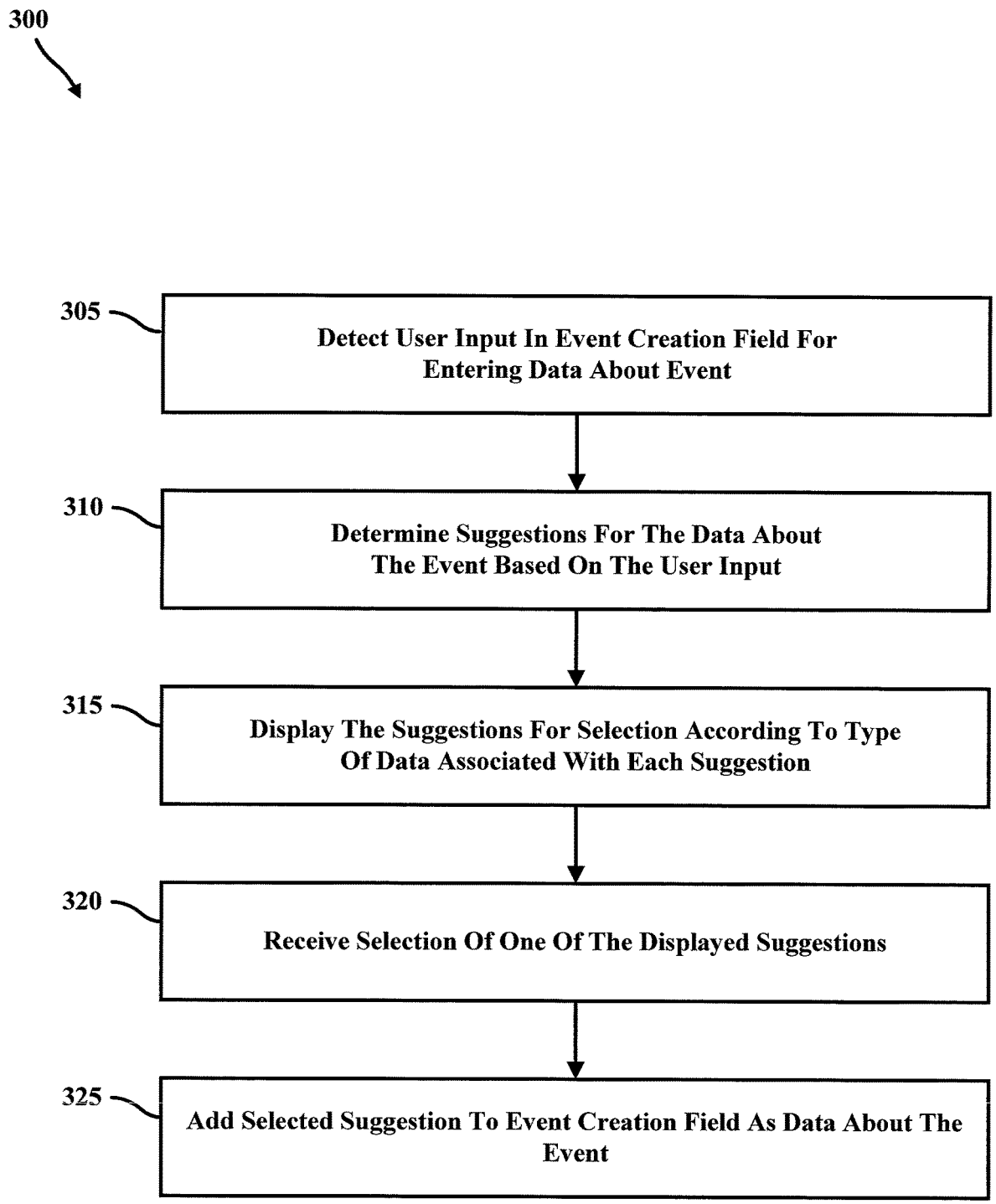
FIG. 3 is a flowchart illustrating an example method for providing a user with suggestions during event creation, where the suggestions relate to details about the event being created according to one or more embodiments described herein.

FIG. 3 illustrates an example process for providing a user with suggestions during the creation of a time-based event. In accordance with at least one embodiment of the present disclosure, the example process 300 may be performed by a suggestion service that takes user-entered text as an input and provides a set of suggestions representing various event details or data components. For example, the process 300 may be performed by an event creation server (e.g., Event Creation Server 140 in the example system 100 shown in FIG. 1) configured to provide such a suggestion service to a user when the user is creation and/or editing an event.

At block 305, user input may be detected in an event creation field for entering data about an event. For example, the user interface screen 500a shown in FIG. 5a includes an example event creation field 505 in which a user may enter or input data about a new event that the user intends to create (or about an existing event that the user intends to edit). For example, the user may input into the event creation field 505 data about one or more of a variety of components of an event including, for example, a title for the event, an activity associated with the event, a person or people associated with (e.g., invited to) the event, start and/or end dates or times for the event, and the like.

In accordance with at least one embodiment of the present disclosure, the event creation field 505 may be displayed to the user in conjunction with a prompt 510. The prompt 510 may include, for example, an indication (e.g., a query, a request, etc.) that the user should begin to enter data about the event. The prompt 510 that may be displayed with the event creation field 505 may be displayed in a variety of other ways in addition to or instead of the manner in which the prompt 510 is illustrated in user interface screen 500a.

Referring back to the example process 300 of FIG. 3, any input from the user in the event creation field that may be detected at block 305 may be in response to a prompt (e.g., prompt 510) displayed or presented to the user upon initiating the creation of a new time-based event.

Figure 5A:
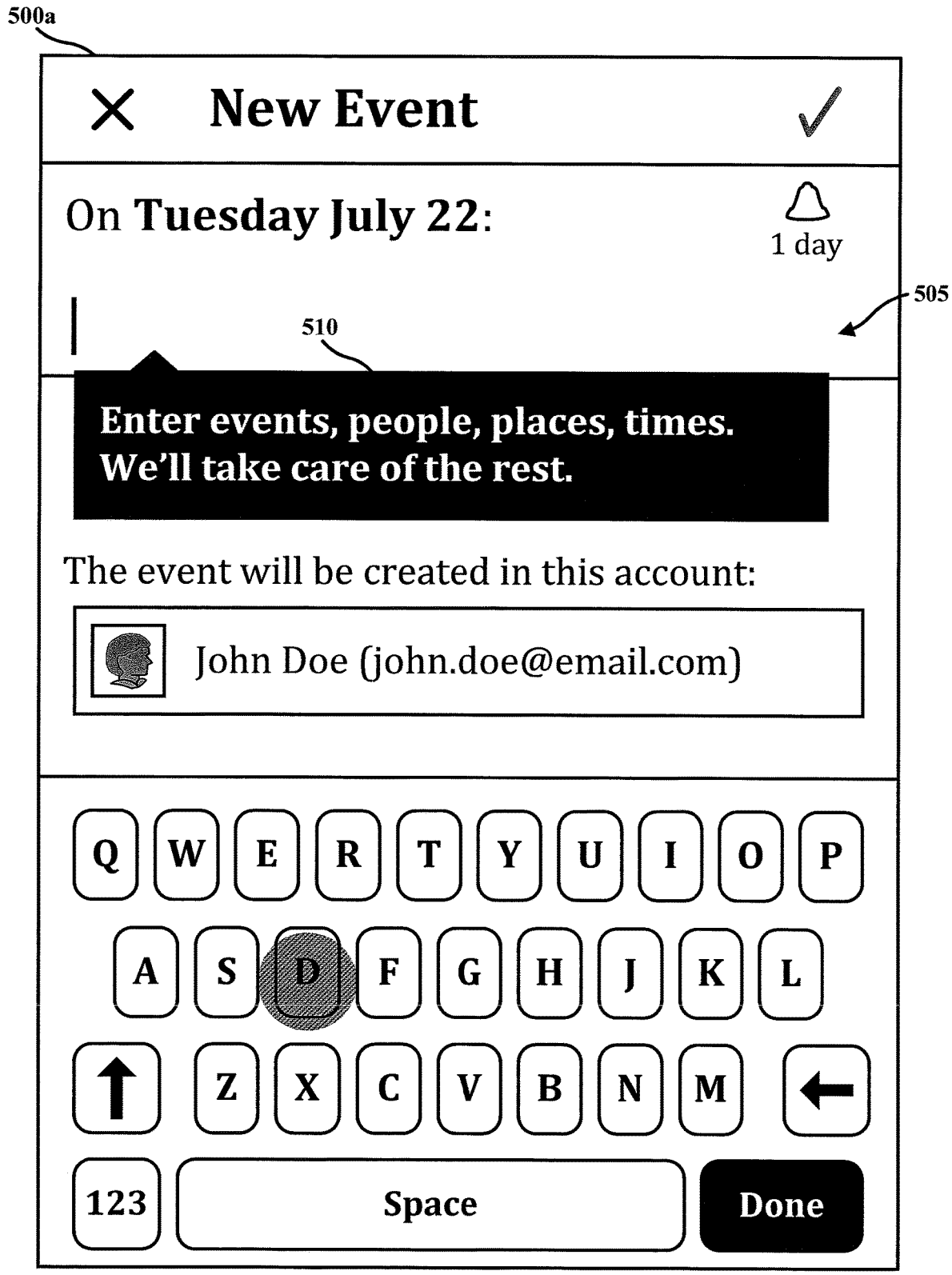
FIG. 5a is a user interface screen illustrating an example event creation field for entering data about an event according to one or more embodiments described herein.
Figure 5B:
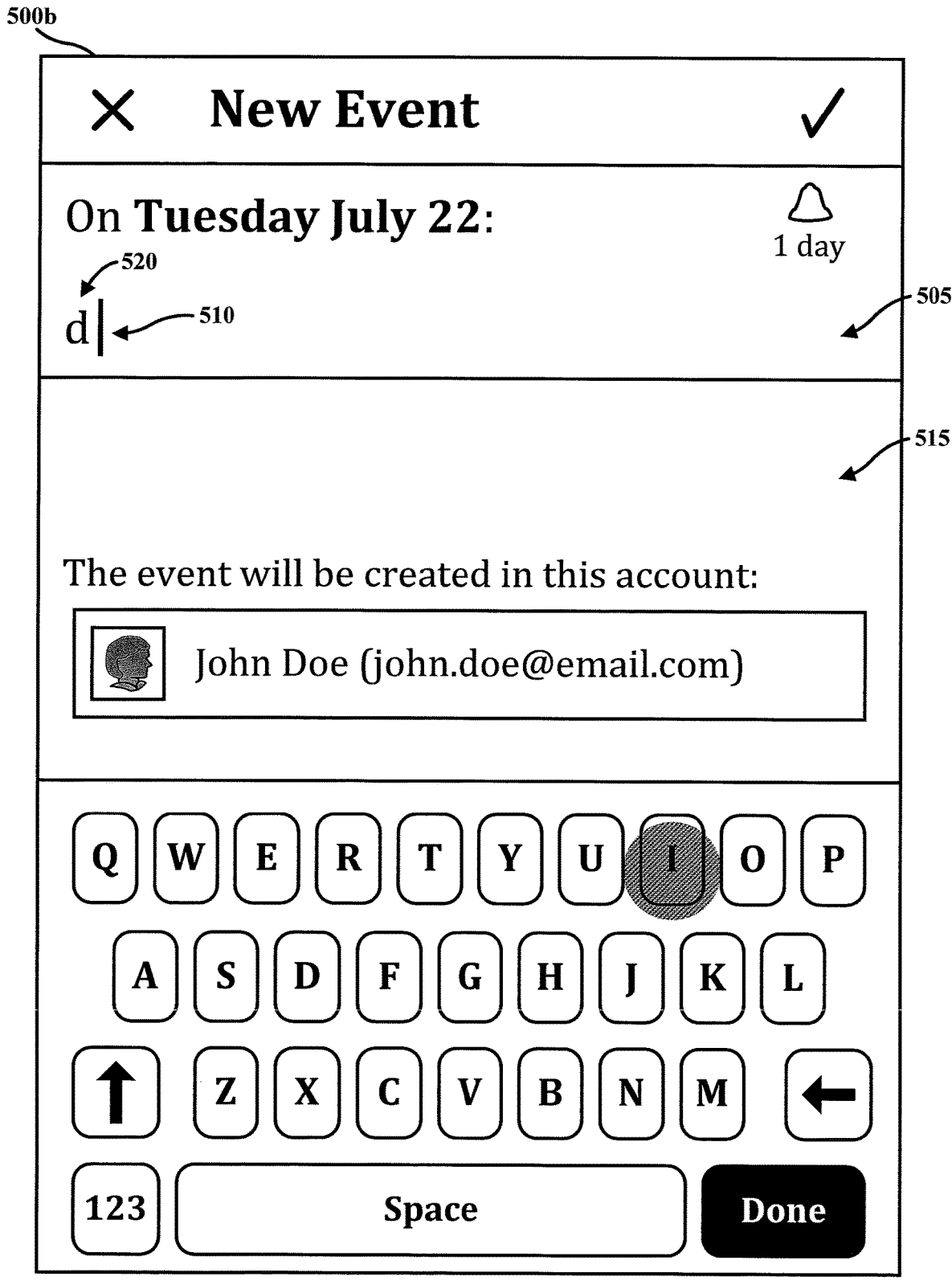
FIG. 5b is a user interface screen illustrating the example event creation field shown in FIG. 5a, where the event creation field contains user input according to one or more embodiments described herein.
Figure 5C:
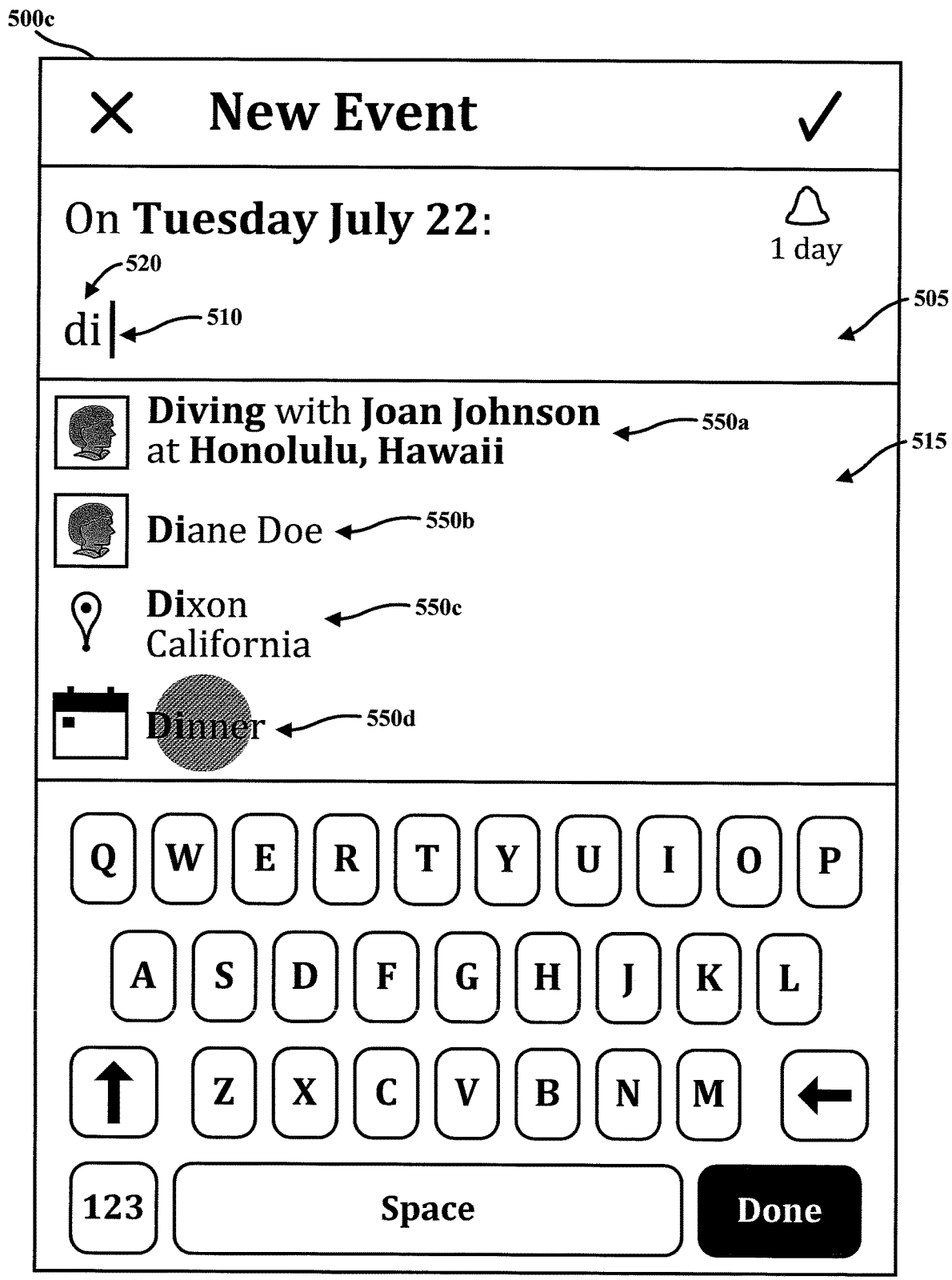
FIG. 5c is a user interface screen illustrating the example event creation field shown in FIG. 5b, where suggestions for data about the event corresponding to the user input are provided for selection according to one or more embodiments described herein.

In the example user interface 500b shown in FIG. 5b, the event creation field 505 includes user input 520 (e.g., the letter "d" has been entered into the event creation field 505) together with a prompt 510 for the user to enter additional data about the event (where the user input 520 in event creation field 505 may be detected at block 305 of the example process 300 described above and illustrated in FIG. 3).

At block 310, one or more suggestions for data about the event may be determined based on the user input detected at block 305. For example, if user input in the event creation field is detected at block 305 to be a combination of letters and/or characters (e.g., a string of text data), then at block 310 one or more suggestions may be determined based on this combination of letters and/or characters. For example, with reference to the example user interface 500c shown in FIG. 5c, if user input 520 in the event creation field 505 is detected (e.g., at block 305) as "di", then the one or more suggestions that may be determined (e.g., at block 310) may be event data components (e.g., event title, contact, event location, etc.) that each include "di" in their contents. In accordance with at least one embodiment, the one or more suggestions determined at block 310 may each begin with the user input detected at block 305 (e.g., if the detected user input is "di" then each of the determined suggestions may begin with "di" such as "Diane Doe", "Dinner", "Dixon, California", and the like). In accordance with one or more other embodiments, the one or more suggestions determined at block 310 may each incorporate or be based on the detected user input in some other manner besides that described above.

At block 315, the one or more suggestions determined at block 310 may be displayed for selection (e.g., by the user). For example, referring again to the example user interface screen 500c shown in FIG. 5c, in accordance with at least one embodiment described herein the event creation field 505 may be displayed with a staging area 515, which may be located in some directional relation (e.g., below, to the side of, etc.) to the event creation field 505. The staging area 515 may include one or more suggestions 550a-550d for data about the event being created in the event creation field 505, where the suggestions 550a-550d may be displayed in the staging area 515 for selection by the user. It should be noted that the suggestions 550a-550d for data about the event may sometimes be referred to as "event component suggestions", "event data suggestions", or by some other similar term or phrase descriptive of the same.

In accordance with at least one embodiment of the present disclosure, the one or more suggestions that may be displayed (at block 315) may be displayed in the staging area 515 according to a type of data associated with each of the suggestions. For example, with reference to the example user interface 600b illustrated in FIG. 6b, the staging area 615 may include suggestions 650, which relate to suggested contacts (e.g., "Diane Doe", "Joan Johnson", etc.) to add to the event creation field 605. The suggestions 650 may be displayed in the staging area 615 based on a determination that the type of data to be added to the event creation field 605 may be a contact of the user.

At block 320, a selection of the one of the suggestions for data about the event displayed at block 315 may be received. For example, in accordance with at least one embodiment, the selection of one of the displayed suggestions at block 320 may be received at an event creation server (e.g., Suggestion Selections (174) received at Event Creation Server 140 via Authentication Server 135 in the example system 100 shown in FIG. 1).

At block 325, the suggestion selected at block 320 may be added to the event creation field as data about the event. For example, with reference to the example user interface 500d shown in FIG. 5d, the selected suggestion "Dinner" 525 has been added to the event creation field 505 in place of the user input (e.g., user input "di" 520 in event creation field 505 in the example user interface 500c shown in FIG. 5c).

Figure 4:
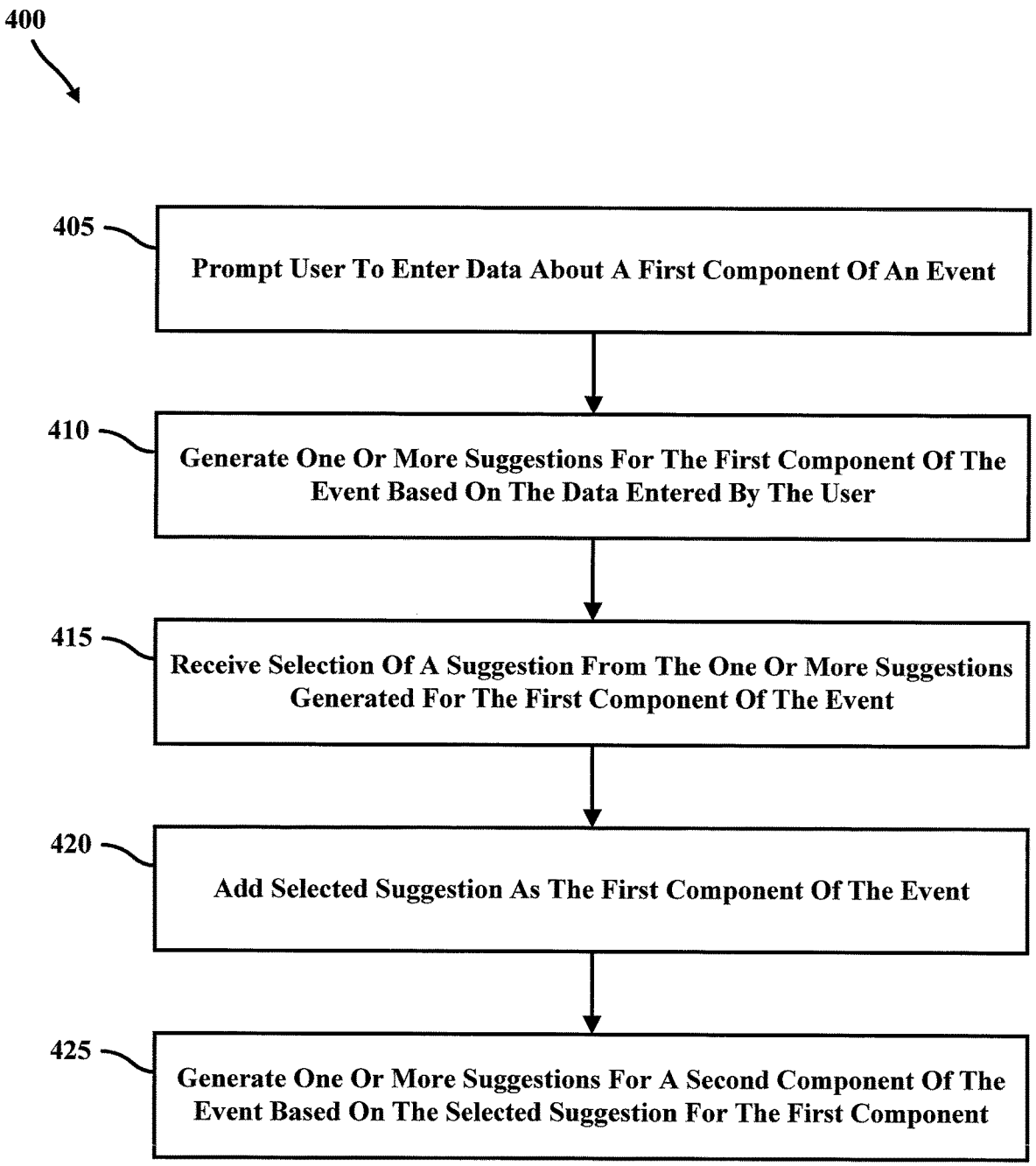
FIG. 4 is a flowchart illustrating an example method for prompting a user to enter data about an event and providing the user with suggestions for the data about the event according to one or more embodiments described herein.

FIG. 4 is an example process 400 for prompting a user to enter data about an event and providing the user with suggestions for different components of the event based on the entered data. In accordance with at least one embodiment of the present disclosure, the example process 400 may be performed by a suggestion service that takes input (e.g., user-entered text) about an event, provides a set of suggestions for a corresponding component of the event, and continues in such a manner until a predetermined number of components of the event have been selected (or entered) by the user. For example, the process 400 may be based on a determination that data for certain basic or main components of an event is needed in order for the event to be considered "complete" (e.g., in order for the event to be "created"). Such main components of an event may include, for example, a title for the event and a date/time for the event. In accordance with one or more embodiments, these main components of an event may be expanded to include one or more of a location for the event, duration of the event, and a contact associated with the event.

In accordance with at least one embodiment, the process 400 may be performed by an event creation server (e.g., Event Creation Server 140 in the example system 100 shown in FIG. 1) configured to provide such a suggestion service to a user when the user is creation and/or editing an event. It should also be noted that, in accordance with one or more embodiments of the present disclosure, the example process 400 may form a part of, or be performed in addition to, the example process 300 described above and illustrated in FIG. 3.

At block 405, a prompt may be presented to a user to enter data about a first component of an event.

At block 410, one or more suggestions for the first component of the event may be generated (and provided or displayed to the user for selection) based on data entered by the user in response to the prompt presented at block 405.

At block 415, a selection of one of the suggestions (generated at block 410) for the first component of the event may be received.

At block 420, the selected suggestion for the first component of the event may be added to an event creation field (e.g., any of event creation fields 505, 605, or 705 in the example user interfaces shown in FIGS. 5-7, respectively) as data for the first component of the event.

At block 425, one or more suggestions for a second component of the event may be generated (and provided or displayed to the user for selection) based on the selected suggestion (from block 415) for the first component of the event.

As mentioned above, FIGS. 5a-5d, 6a-6f, 7a-7g, and 8 illustrate example user interface screens including components that may be used in implementing one or more of the various embodiments of the methods and systems described herein. The features and components of the illustrative user interface screens presented in FIGS. 5a-5d, 6a-6f, 7a-7g, and 8 are described in the context of example calendar events being created by a hypothetical user, where the user is provided with suggestions for various data components of the events being created. It should be understood that the particular subject-matter of the content contained in any of the example user interface screens shown in FIGS. 5a-5d, 6a-6f, 7a-7g, and 8, as well as the arrangement of any of the various components comprising these example user interfaces are for illustrative purposes only, and are not in any way intended to limit the scope of the present disclosure. It should also be understood that numerous other variations, types, combinations, and arrangements of user interface screens may also be used to implement certain features of the methods and systems described herein, in addition to or instead of the example user interfaces shown in FIGS. 5a-5d, 6a-6f, 7a-7g, and 8.

The illustrative user interface screens shown in FIGS. 5a-5d, 6a-6f, 7a-7g, and 8 are examples of what may constitute an event data suggestion service in accordance with one or more of the embodiments described herein.

FIGS. 6a-6f are user interface screens illustrating an example progression of an suggestion service for assisting users in creating time-based events, where the creation of the time-based event is already in progress. In accordance with one or more embodiments described herein, user interface screens 600a-600f, and the various components, features, and functionalities included therein, may be used to provide a user with event data suggestions during, for example, the creation of a new event (e.g., calendar event). For example, user interface screens 600a-600f may be used following the progression of the suggestion service as illustrated in the example user interface screens 500a-500d of FIGS. 5a-5d, described above.

Figure 5D:
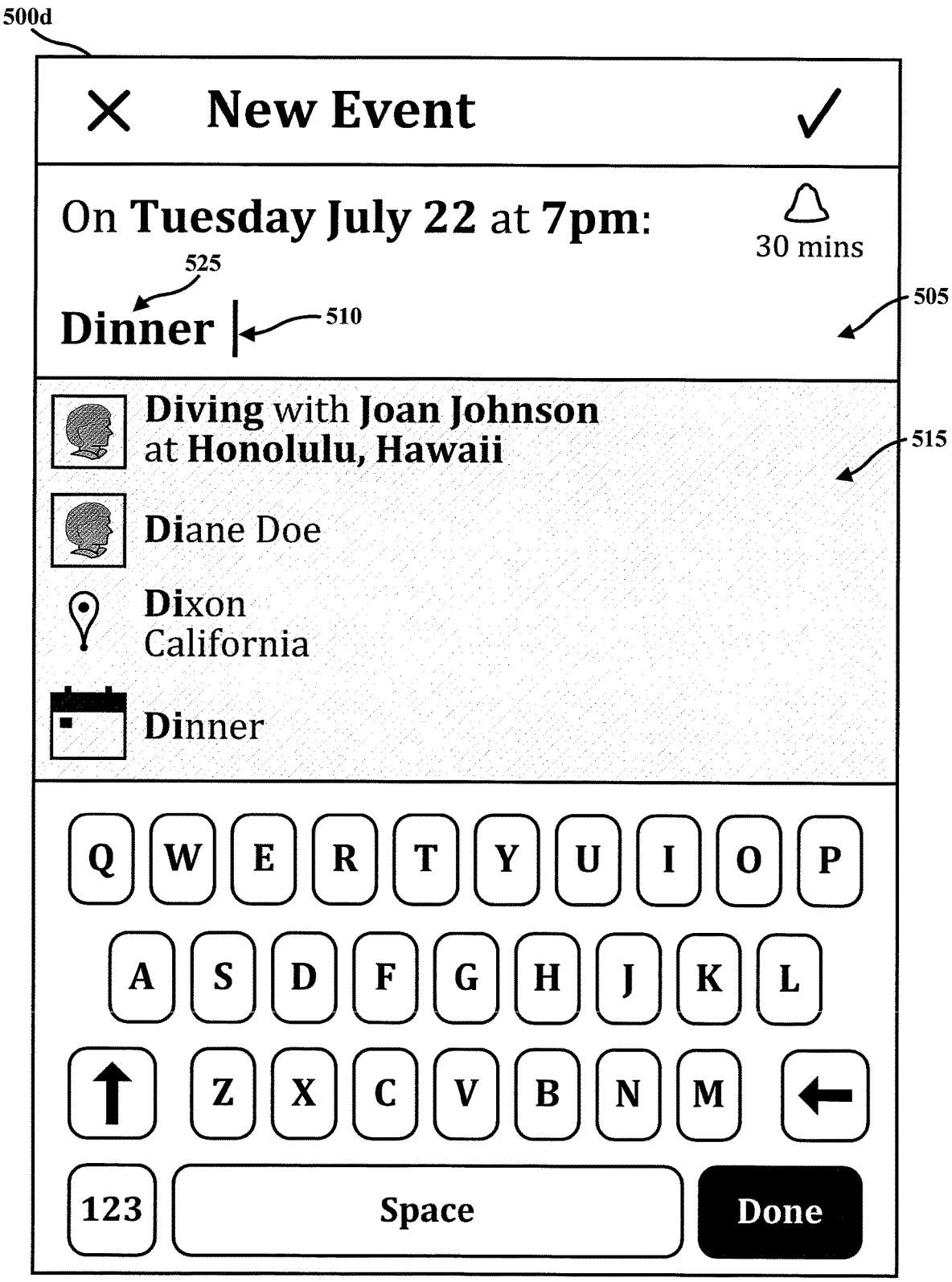
FIG. 5d is a user interface screen illustrating the example event creation field shown in FIG. 5c, where a selected suggestion for data about the event is displayed in the event creation field in place of the user input according to one or more embodiments described herein.
Figure 6A:
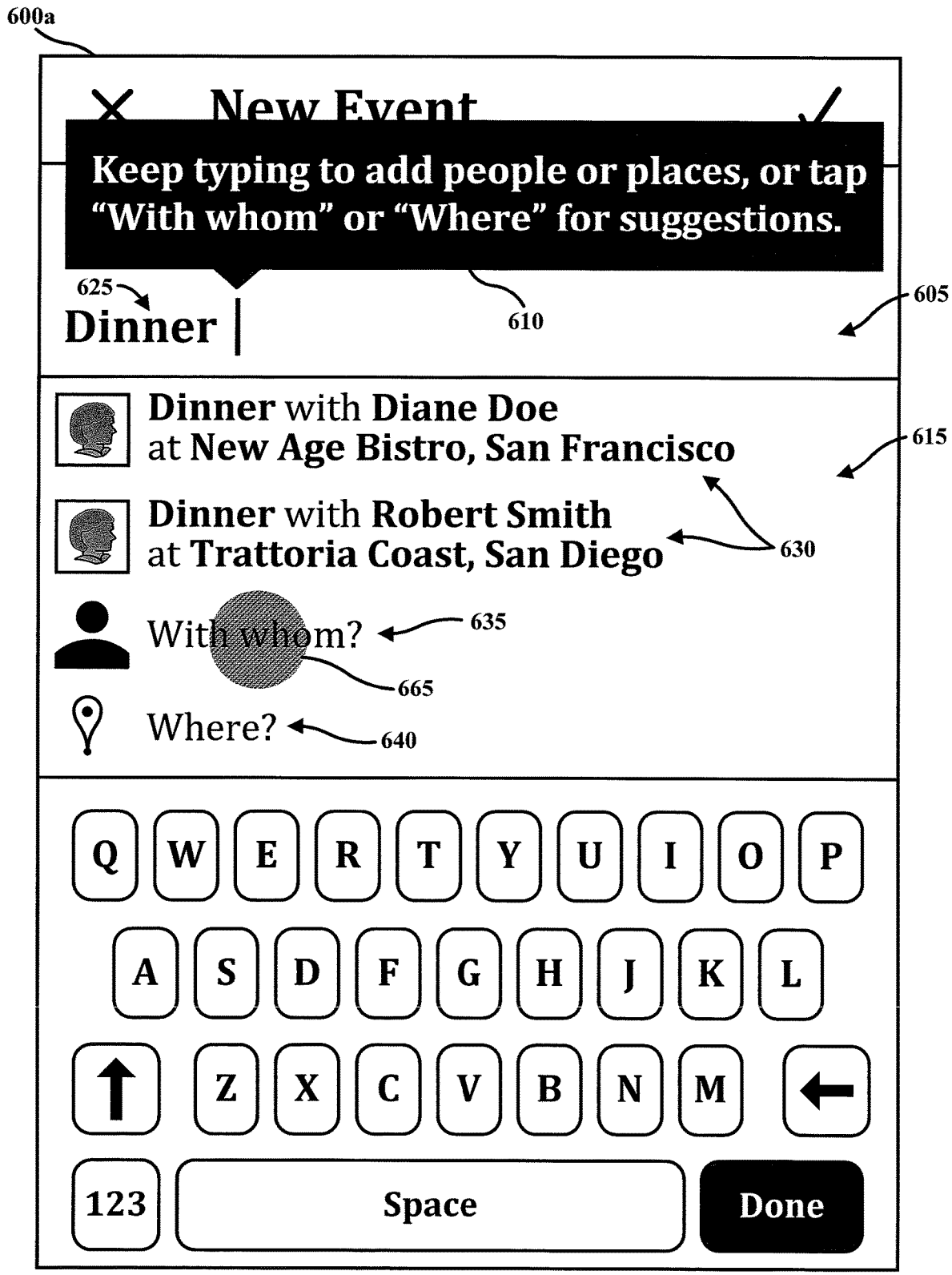
FIG. 6a is a user interface screen illustrating an example event creation field displaying a selected suggestion for data about an event, a prompt to enter additional data about the event, and suggestions for the additional data about the event according to one or more embodiments described herein.

FIG. 6a is an user interface screen 600a illustrating an example event creation field 605 including a selected suggestion 625 (e.g., "Dinner", which was added to the event creation field 505 in the example user interface 500d illustrated in FIG. 5d and described above) for data about the event being created together with a prompt 610 for the user to enter additional data about the event. The example user interface 600a also includes a staging area 615 (which may be similar to the staging area 515 illustrated in the example user interfaces 500a-500d shown in FIGS. 5a-5d) in which suggestions 630, 635, 640 for the additional data about the event may be displayed.

In accordance with at least one embodiment of the present disclosure, the suggestions for the additional data about the event, displayed in the staging area 615, may be based on the already selected suggestion 625. For example, suggestions 630 may be based on one or more other events associated with the user (e.g., past events, already scheduled future events, etc.), where the suggestions 630 include multiple event data components (e.g., a complete event title including an activity ("Dinner"), a contact ("Diane Doe" or "Robert Smith"), and a location ("New Age Bistro, San Francisco" or "Trattoria Coast, San Diego")). As another example, suggestions 635 and 640, which are similar to additional prompts or queries in that the suggestions 635 and 640 ask the user to consider identifying a contact and a location for the event being created, may be based on a determination that the already selected suggestion ("Dinner") is typically associated with the additional event data components of a contact and a location.

Figure 6B:
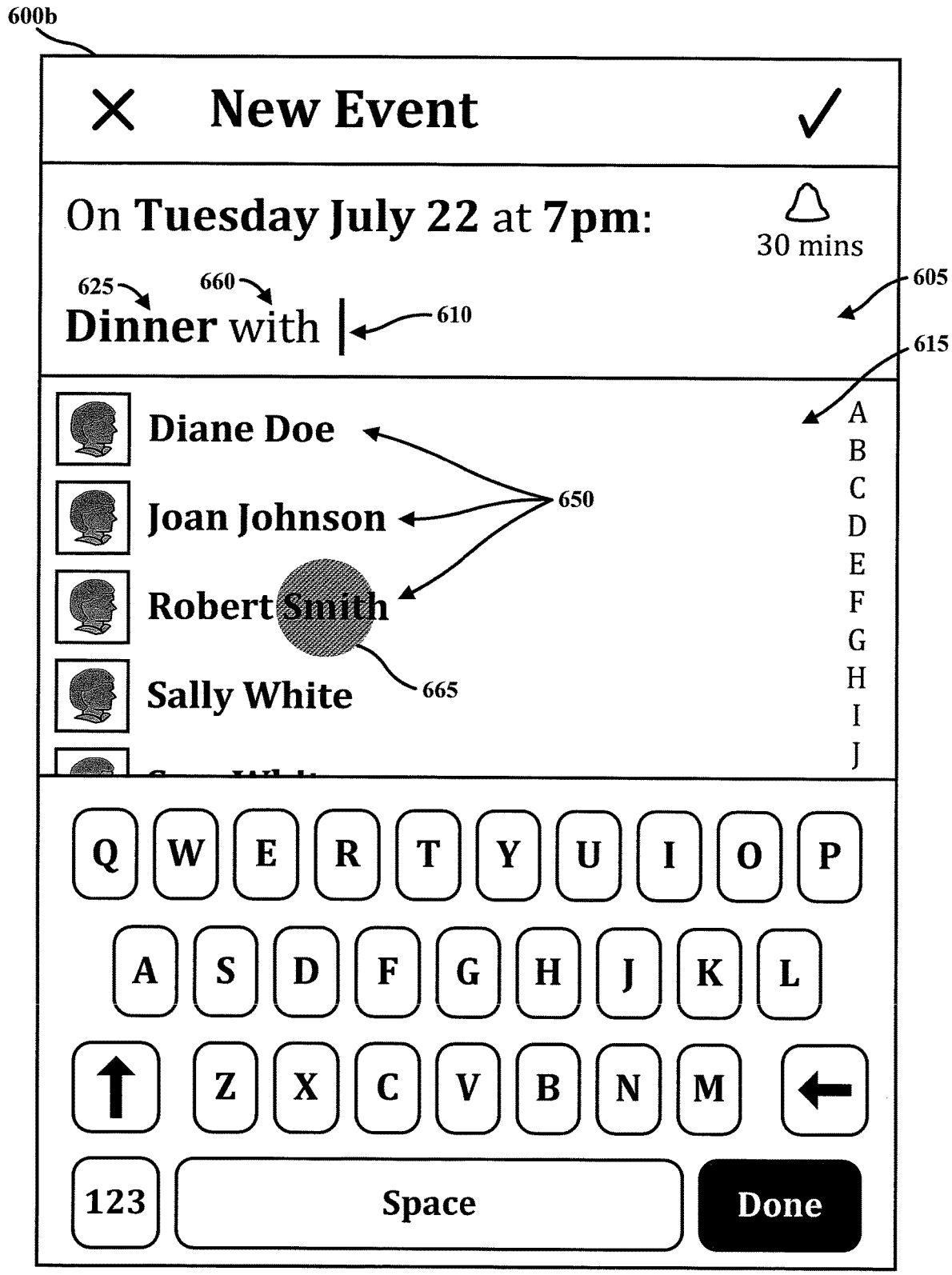
FIG. 6b is a user interface screen illustrating the example event creation field shown in FIG. 6a, where the selected suggestion for data about the event is displayed in the event creation field in conjunction with a selected connector term, and additional suggestions for data about the event based on the connector term are provided for selection according to one or more embodiments described herein.
Figure 6C:
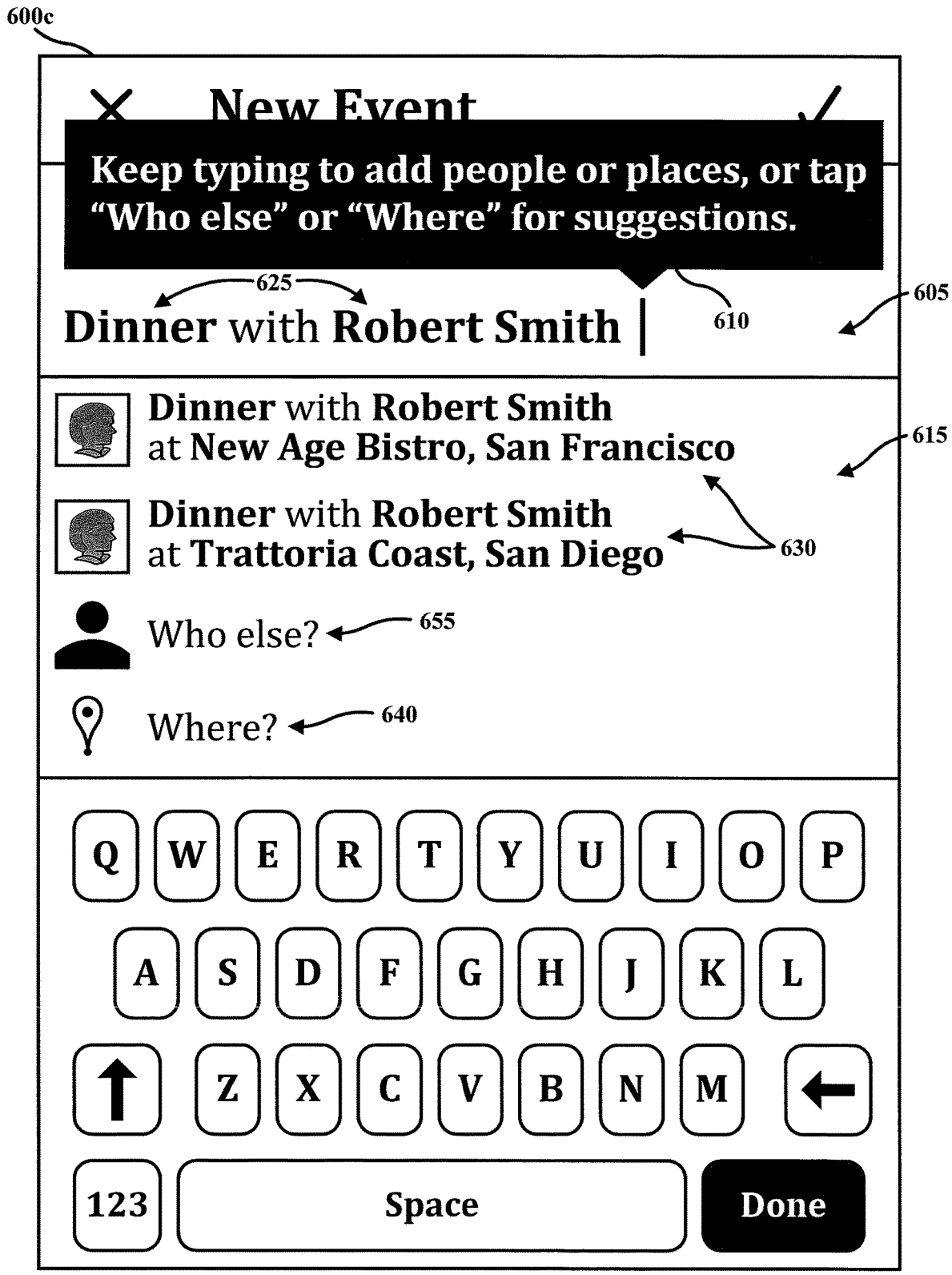
FIG. 6c is a user interface screen illustrating the example event creation field shown in FIG. 6b, where the event creation field includes first and second selected suggestions for data about the event, a selected connector term, a prompt to enter additional data about the event, and additional suggestions for data about the event based on the type of prompt are provided for selection according to one or more embodiments described herein.
Figure 6D:
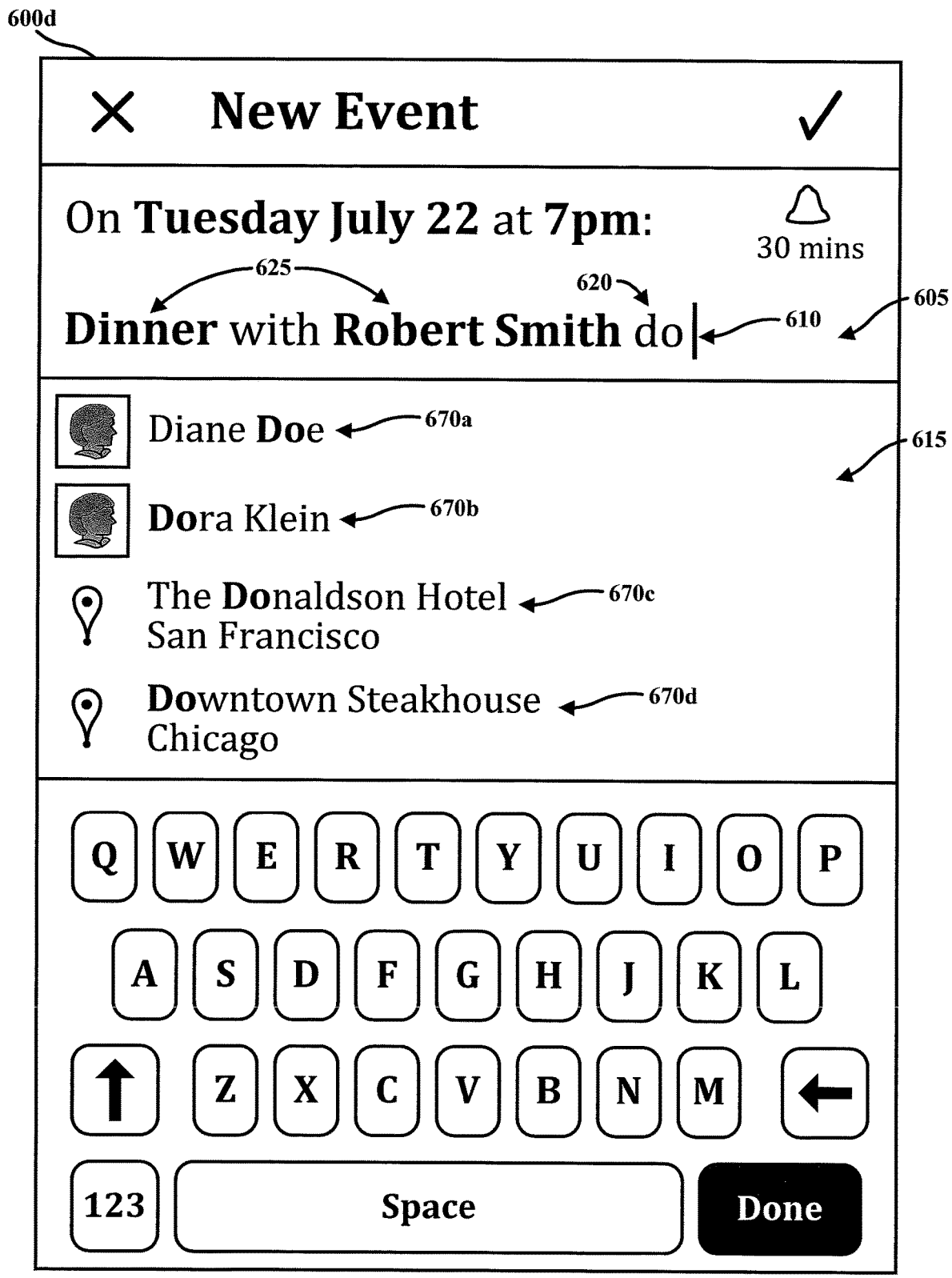
FIG. 6d is a user interface screen illustrating the example event creation field shown in FIG. 6c, where the event creation field includes selected suggestions for data about the event, a selected connector term, and additional user input, and suggestions for additional data about the event corresponding to the additional user input are provided for selection according to one or more embodiments described herein.
Figure 6E:
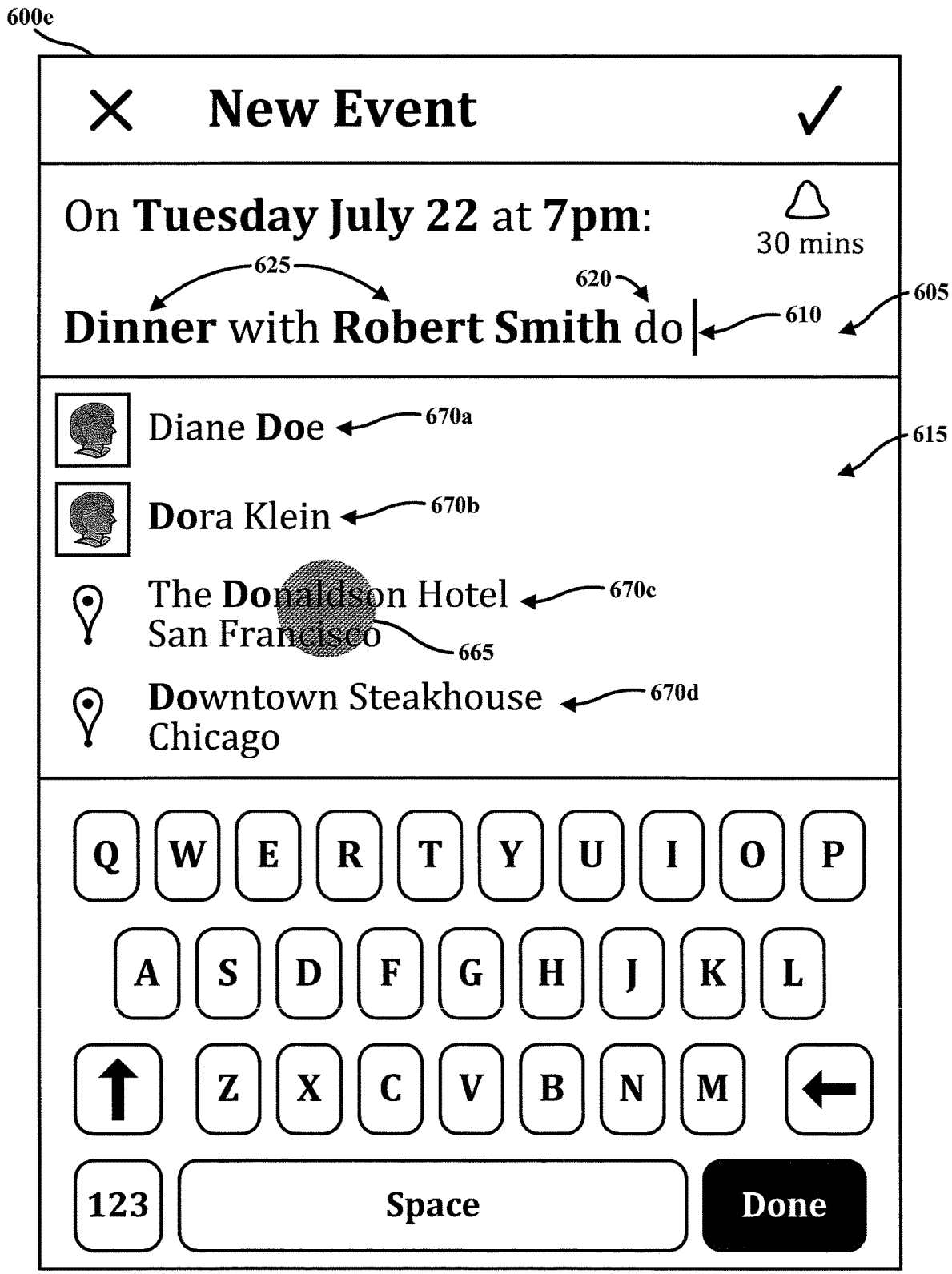
FIG. 6e is a user interface screen illustrating the example event creation field shown in FIG. 6d, where one of the provided suggestions for additional data about the event is marked for selection according to one or more embodiments described herein.
Figure 6F:
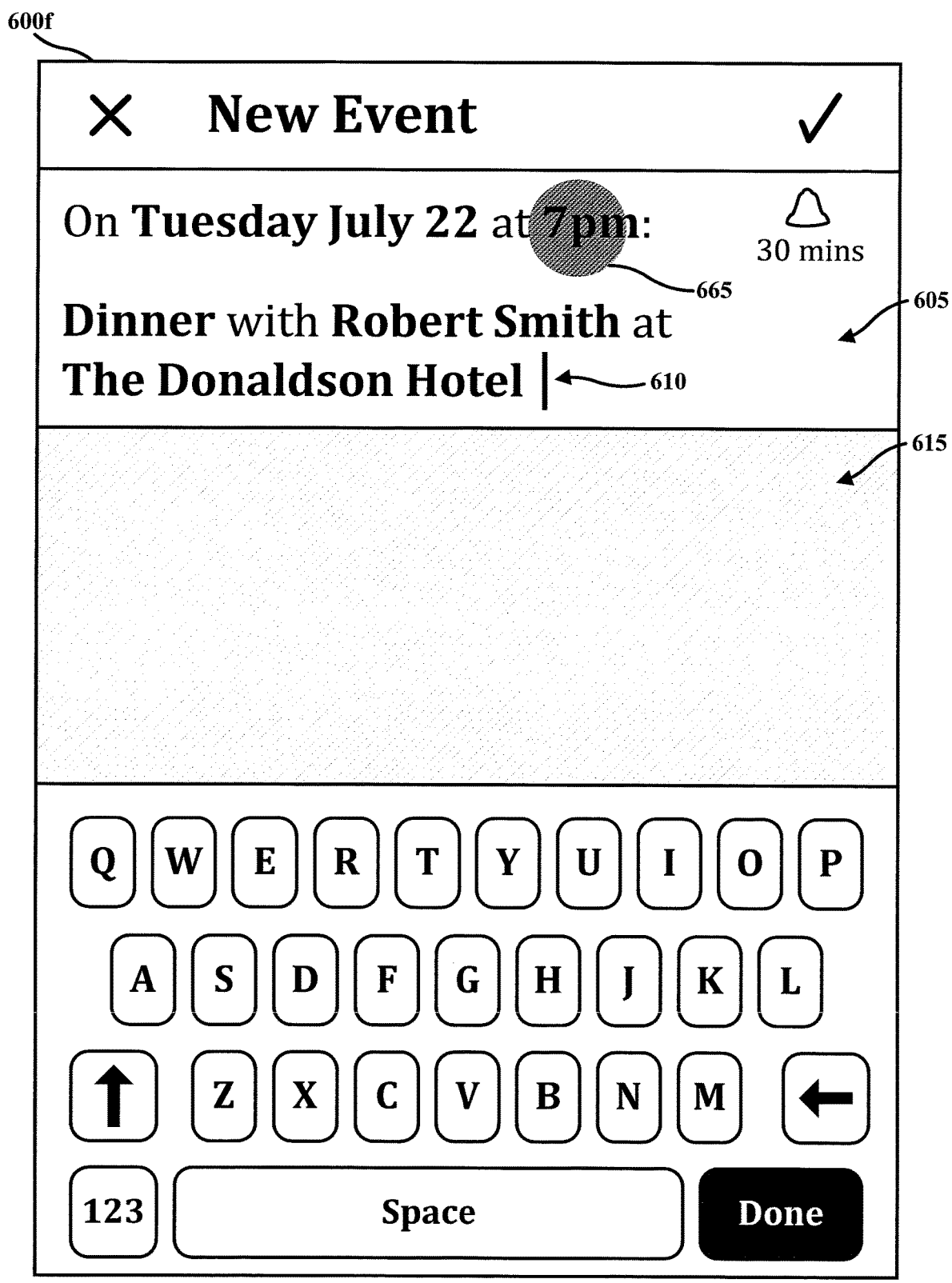
FIG. 6f is a user interface screen illustrating the example event creation field shown in FIG. 6e, where the marked suggestion for additional data about the event is added to the event creation field as data about the event according to one or more embodiments described herein.

In the example user interface screen 600b shown in FIG. 6b, the event creation field 605 (shown in user interface 600a in FIG. 6a) includes the selected suggestion 625 for data about the event (e.g., "Dinner") together with a connector term 660 (e.g., "with") and the prompt 610 to enter additional data about the event. In accordance with at least one embodiment described herein, a connector term (e.g., connector term 660) may be added to the event creation field in response to receiving a selection (e.g., from the user) of a suggested type of data to add to the event creation field. For example, with reference to the example user interface 600a shown in FIG. 6a, in response to suggestion 635 ("With whom?") being selected, the connector term "with" may be added to the event creation field 605, as shown in the example user interface 600b in FIG. 6b.

It should be understood that numerous other connector terms may be added to the event creation field in response to receiving a selection of one or more other suggested types of data to add to the event creation field, in addition to or instead of the example connector term and suggested type of data described above. For example, referring again to the example user interface 600a shown in FIG. 6a, in response to suggestion 640 ("Where?") being selected, a connector term such as "at" may be added to the event creation field 605. A non-exhaustive and non-limiting list of other example connector terms include "to", "for", "on", "and", "from", etc.

Referring back to the example user interface screen 600b illustrated in FIG. 6b, the staging area 615 may include suggestions 650, which may be based on the particular connector term 660 added to the event creation field 605. For example, suggestions 650 all relate to suggested contacts (e.g., "Diane Doe", "Joan Johnson", etc.) to add to the event creation field 605. The suggestions 650 may be displayed in the staging area 615 based on a determination that the type of data to be added to the event creation field 605 is a contact of the user (e.g., in response to receiving a selection of suggestion 635 ("With whom?") in the example user interface 600a shown in FIG. 6a).

The staging area 615 of the example user interface 600b includes a selection indicator 665 (e.g., cursor, pointer, mark, etc.). Similar selection indicators may also be included in one or more of the other example user interface screens illustrated in FIGS. 5a-5d, 6a-6f, 7a-7g, and 8. It should be understood that such selection indicators are merely included in the example user interface screens to aid in the description of various features and/or functionalities associated with the example user interface screens. Depending on the particular implementation, such selection indicators (or variations thereof) may or may not be included in any user interface screens utilized in connection with the suggestions service described herein.

FIGS. 6c-6f are example user interfaces (600c-600f) that further illustrate the various features and functionalities of the example user interfaces 500a-500d shown in FIGS. 5a-5d and the example user interfaces 600a and 600b shown in FIGS. 6a and 6b, respectively, which are described in detail above. Thus, for purposes of brevity, the example user interfaces 600c-600f will not be further described in detail.

FIGS. 7a-7g are user interface screens illustrating an example progression of an event data suggestion service. In accordance with one or more embodiments described herein, user interface screens 700a-700g, and the various components, features, and functionalities included therein, may be used to provide a user with event data suggestions during, for example, the creation of a new event (e.g., calendar event).

Figure 7A:
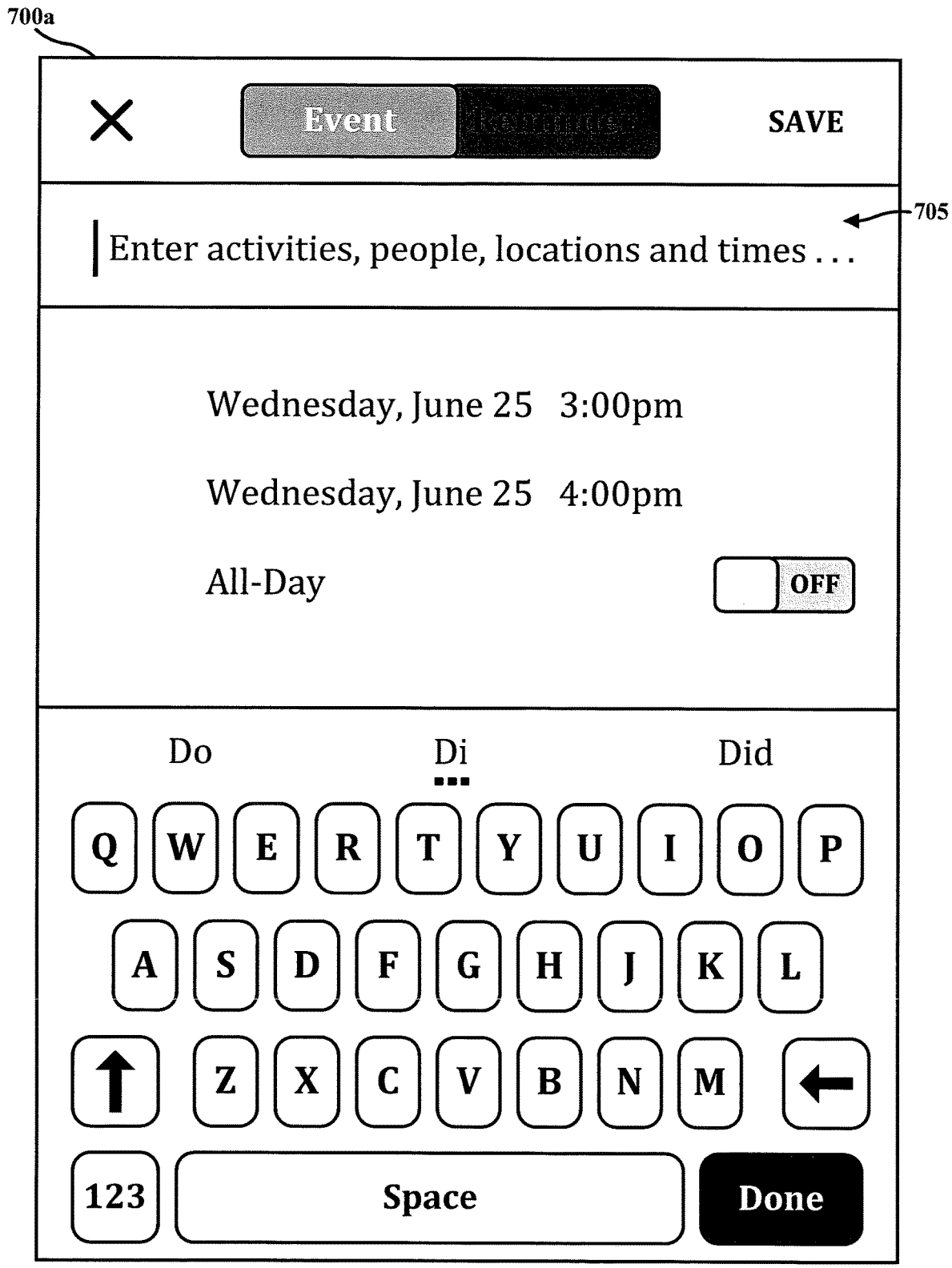
FIG. 7a is a user interface screen illustrating an example event creation field for entering data about an event according to one or more embodiments described herein.

FIG. 7a shows an example event creation field 705 in which a user may, for example, enter or input data about a new event that the user intends to create (or about an existing event that the user intends to edit). For example, the user may input into the event creation field 705 data about one or more of a variety of components of an event including, for example, a title for the event, an activity associated with the event, a person or people associated with (e.g., invited to) the event, start and/or end times for the event, and the like.

Figure 7B:
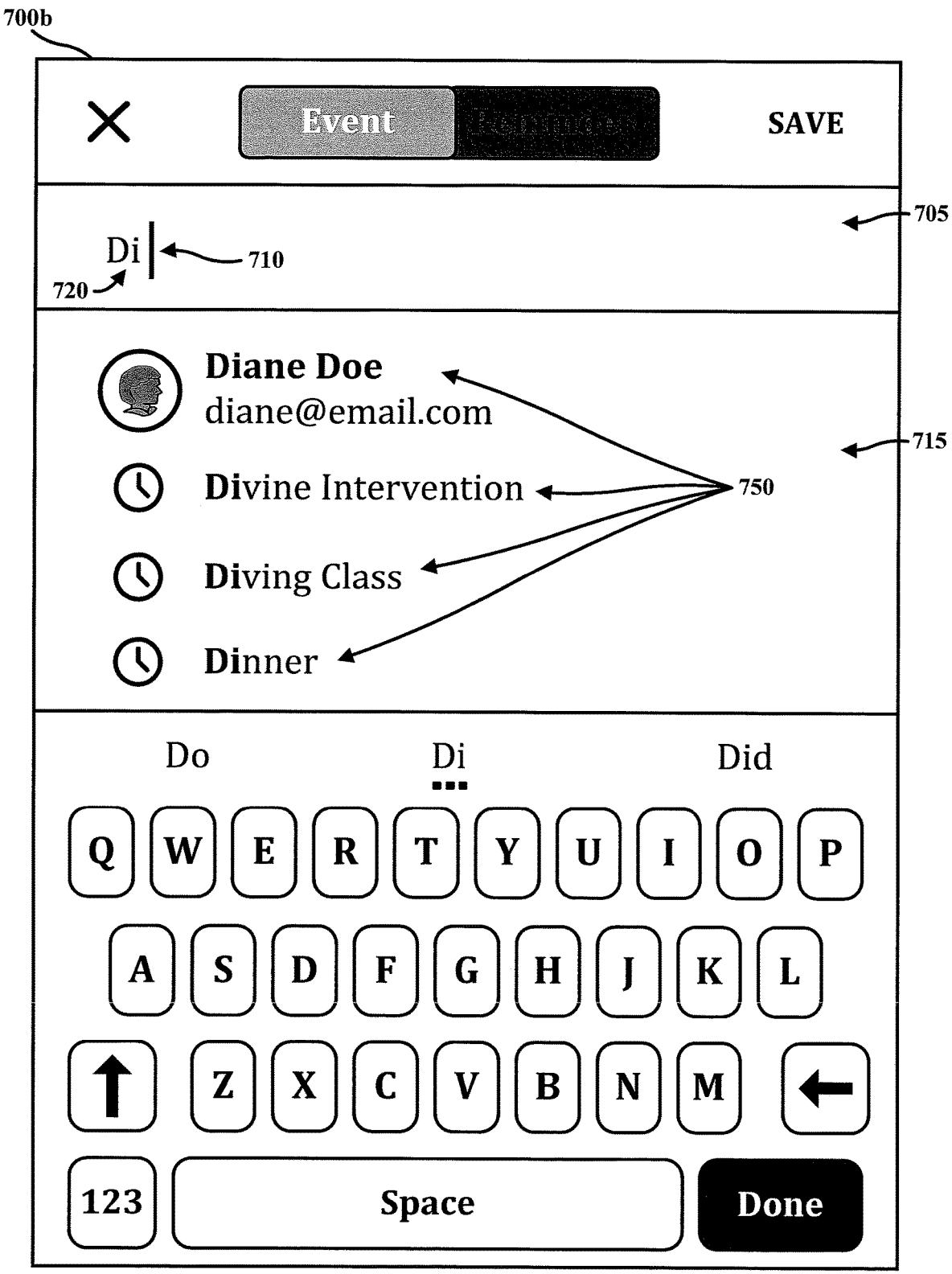
FIG. 7b is a user interface screen illustrating the example event creation field shown in FIG. 7a, where the event creation field contains user input, and suggestions for data about the event corresponding to the user input are provided for selection according to one or more embodiments described herein.

In the example user interface 700b shown in FIG. 7b, the event creation field 705 includes user input 720 (e.g., the phrase "Di" has been entered into the event creation field 705) together with a prompt 710 for the user to enter additional data about the event. In accordance with at least one embodiment described herein, the user interface screen 700b may also include a staging area 715, which may be located in some directional relation (e.g., below, to the side of, etc.) to the event creation field 705. The staging area 715 may include one or more suggestions 750 for data about the event being created in the event creation field 705, where the suggestions 750 may be displayed in the staging area 715 for selection by the user. It should be noted that the suggestions 750 for data about the event may sometimes be referred to as "event component suggestions", "event data suggestions", or by some other similar term or phrase descriptive of the same.

In accordance with at least one embodiment, the suggestions 750 for data about the event may be generated based on the user input 720, and the generated suggestions 750 displayed in the staging area 715 for selection by the user. The suggestions 750 provided to the user may update/change as the user input 720 in the event creation field 705 updates/changes. For example, if the user input in the event creation field 705 is determined to be "Di", then the corresponding suggestions 750 provided to the user in the staging area 715 may include one or more components for the event that each begin with "Di". For example, the one or more event component suggestions 750 displayed in the staging area 715 may be suggestions related to a person or group (e.g., "Diane Doe") associated with the event, a title for the event (e.g., "Divine Intervention"), an activity (e.g., "Diving Class" or "Dinner") associated with the event, and/or any of a variety of other components or detail categories for an event.

In accordance with at least one embodiment of the present disclosure, the prompt 710 provided to the user (e.g., in the event creation field 705) may be in the form of a blinking cursor. In accordance with one or more other embodiments described herein, the prompt 710 provided to the user may be in the form of a callout, a data entry or text box, or in some other format designed to attract the attention of the user and cause the user to enter additional data about the event and/or selected one of the suggestions provided for the data about the event.

Figure 7C:
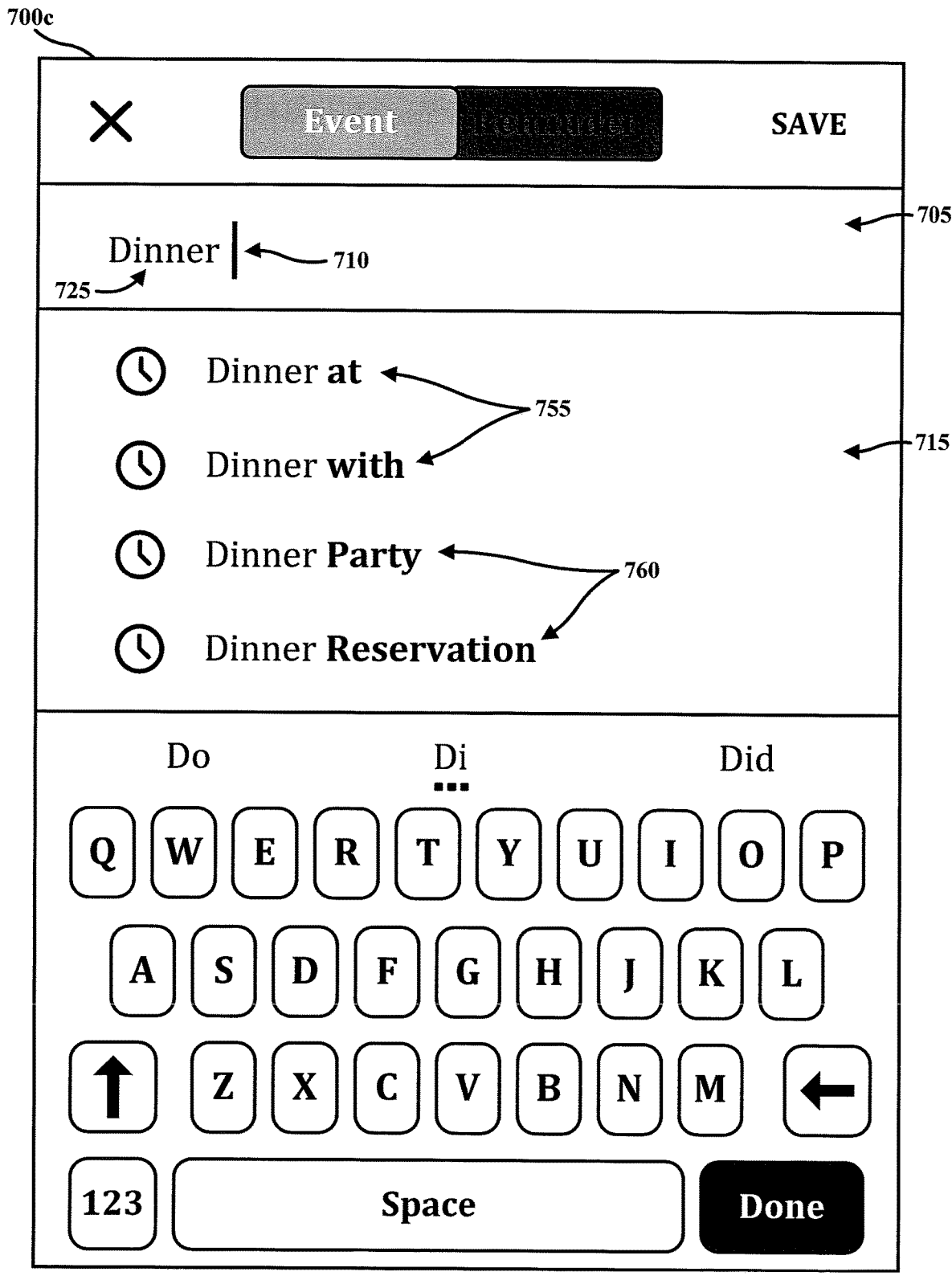
FIG. 7c is a user interface screen illustrating the example event creation field shown in FIG. 7b, where a selected suggestion for data about the event is displayed in the event creation field in place of the user input, and additional suggestions for data about the event are provided for selection according to one or more embodiments described herein.

FIG. 7c shows a user interface 700c in which an event component suggestion (e.g., one of suggestions 750 displayed in the staging area 715 of example user interface 700b shown in FIG. 7b) selected by the user has been added to the event creation field 705 as data 725 about the event. The selected suggestion 725 (e.g., "Dinner") may be displayed in the event creation field 705 together with prompt 710. The example user interface 700c also includes one or more additional suggestions (755, 760) for data about the event that may be provided in the staging area 715 once the selected suggestion 725 is added to the event creation field 705. In accordance with at least one embodiment of the present disclosure, the additional suggestions that may be provided to the user may include one or more suggested "connectors" 755 (e.g., connecting terms, including "as", "with", "for", "to", "in", etc.) and/or one or more other event data component suggestions 760. The one or more other event data component suggestions 760 may be based on, or have some relation to, the selected suggestion 725 already added to the event creation field 705. For example, the other event data suggestions 760 may be complementary of the selected suggestion 725 such that, when combined with the selected suggestion 725, the two suggestions form a component of the event (e.g., "Dinner" combined with "Party" to form "Dinner Party", or "Dinner" combined with "Reservation" to form "Dinner Reservation").

Figure 7D:
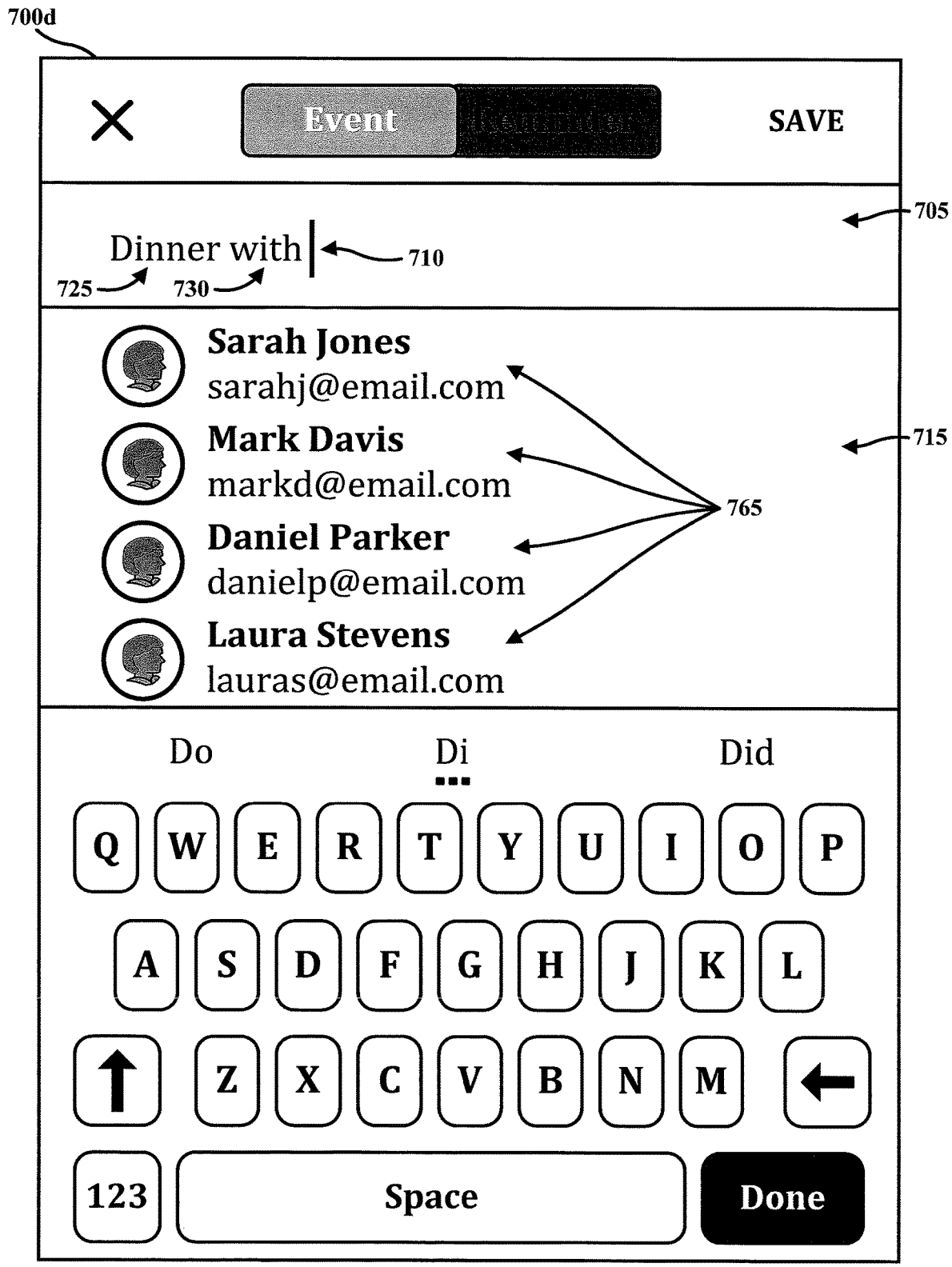
FIG. 7d is a user interface screen illustrating the example event creation field shown in FIG. 7c, where the selected suggestion for data about the event is displayed in the event creation field in conjunction with a selected connector term, and additional suggestions for data about the event are provided for selection according to one or more embodiments described herein.

FIG. 7d is a user interface screen 700d in which the first selected suggestion 725 and a selected connector term 730 are displayed in the event creation field 705 as data about the event. The user interface screen 700d also includes additional suggestions 765 for components of the event, where the additional suggestions may be displayed in the staging area 715.

Figure 7E:
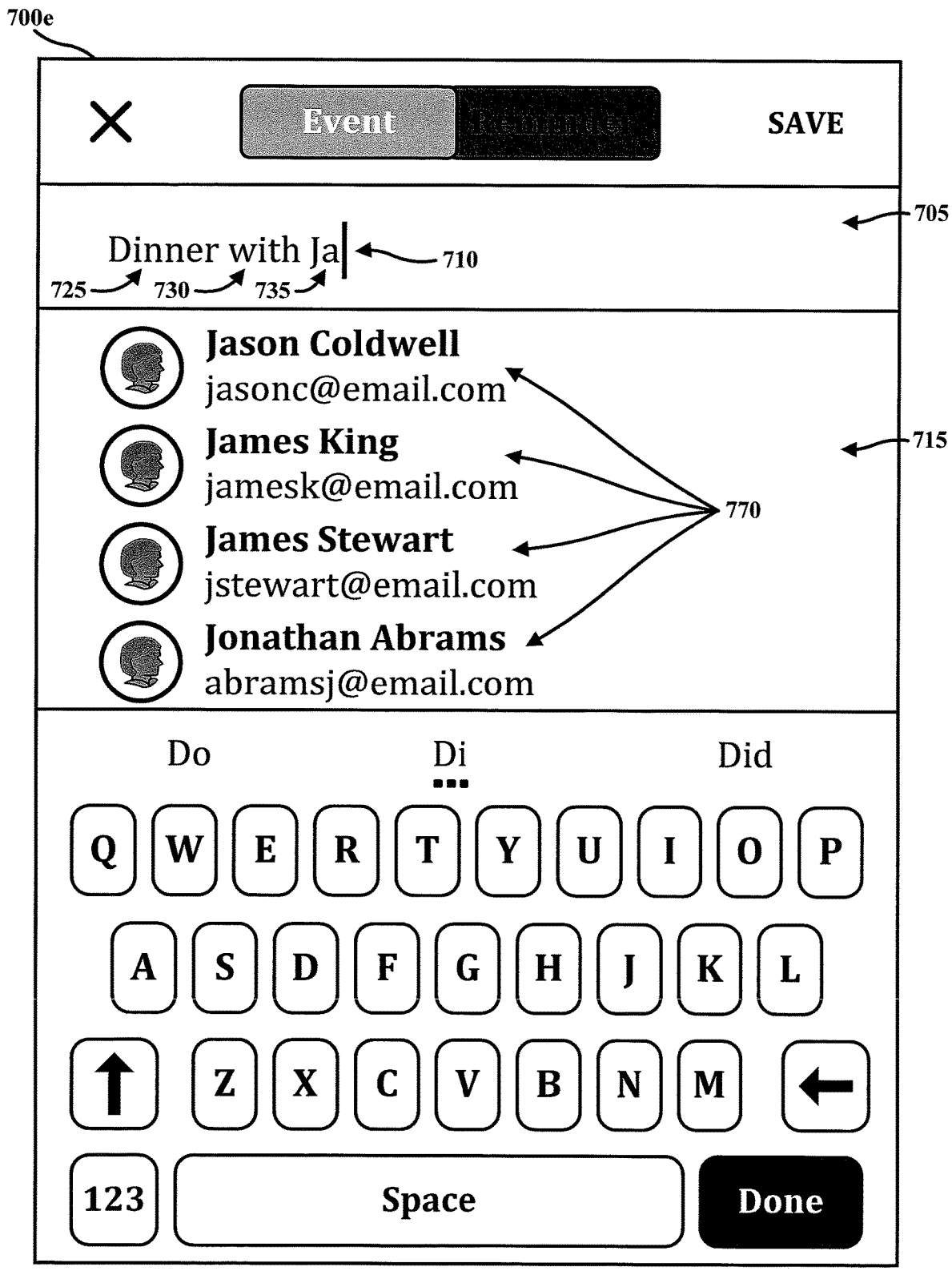
FIG. 7e is a user interface screen illustrating the example event creation field shown in FIG. 7d, where the selected suggestion for data about the event is displayed in the event creation field in conjunction with the selected connector term and additional user input, and suggestions corresponding to the additional user input are provided for selection according to one or more embodiments described herein.

FIG. 7e is a user interface screen illustrating the example event creation field shown in FIG. 7d, where the selected suggestion for data about the event is displayed in the event creation field 705 in conjunction with the selected connector term and additional user input, and suggestions corresponding to the additional user input are provided for selection according to one or more embodiments described herein.

Figure 7F:
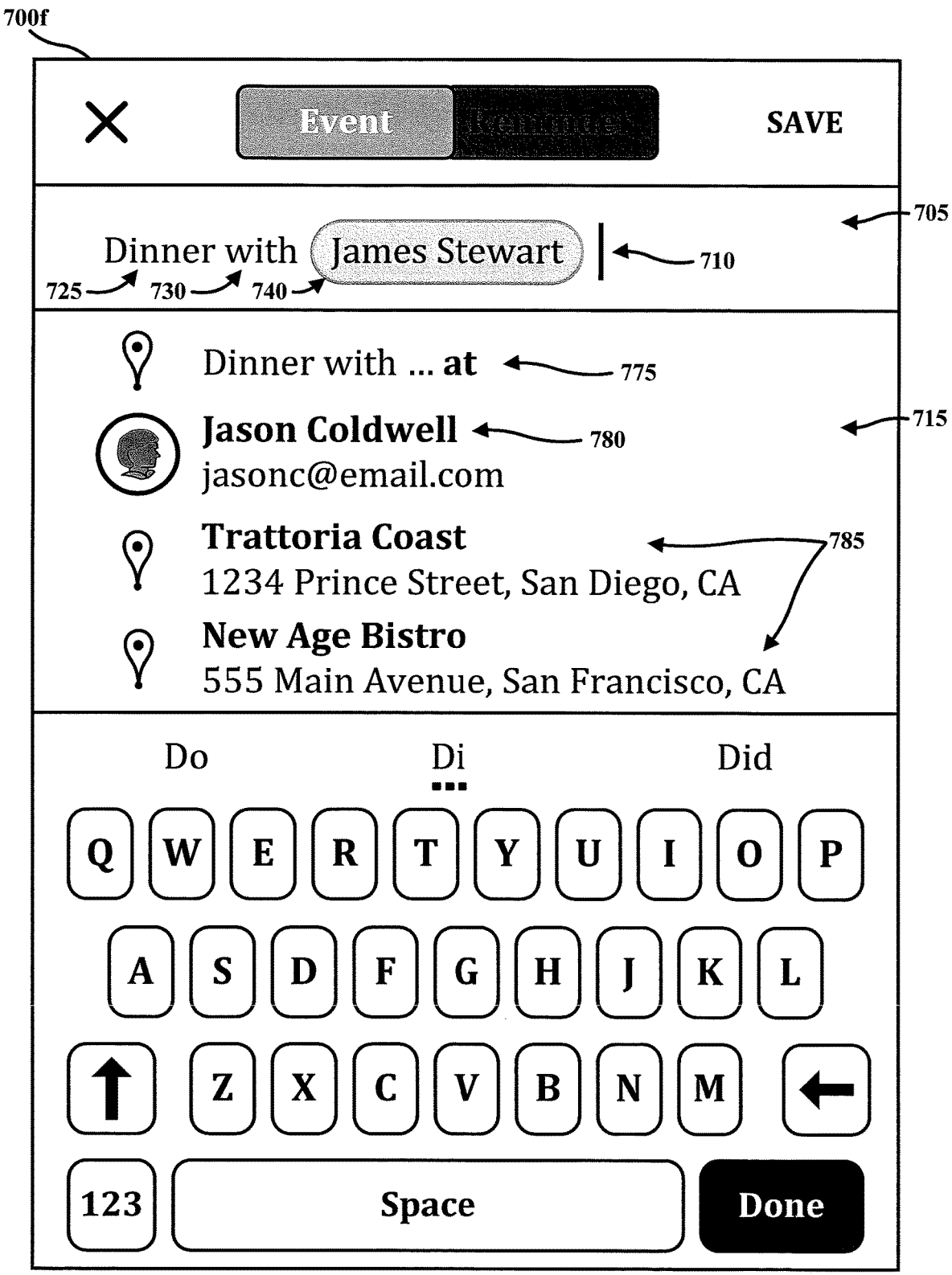
FIG. 7f is a user interface screen illustrating the example event creation field shown in FIG. 7e, where the event creation field includes first and second selected suggestions for data about the event together with a selected connector term, and suggestions for additional data about the event are provided for selection according to one or more embodiments described herein.

FIG. 7f is a user interface screen illustrating the example event creation field shown in FIG. 7e, where the event creation field includes first and second selected suggestions for data about the event together with a selected connector term, and suggestions for additional data about the event are provided for selection according to one or more embodiments described herein.

Figure 7G:
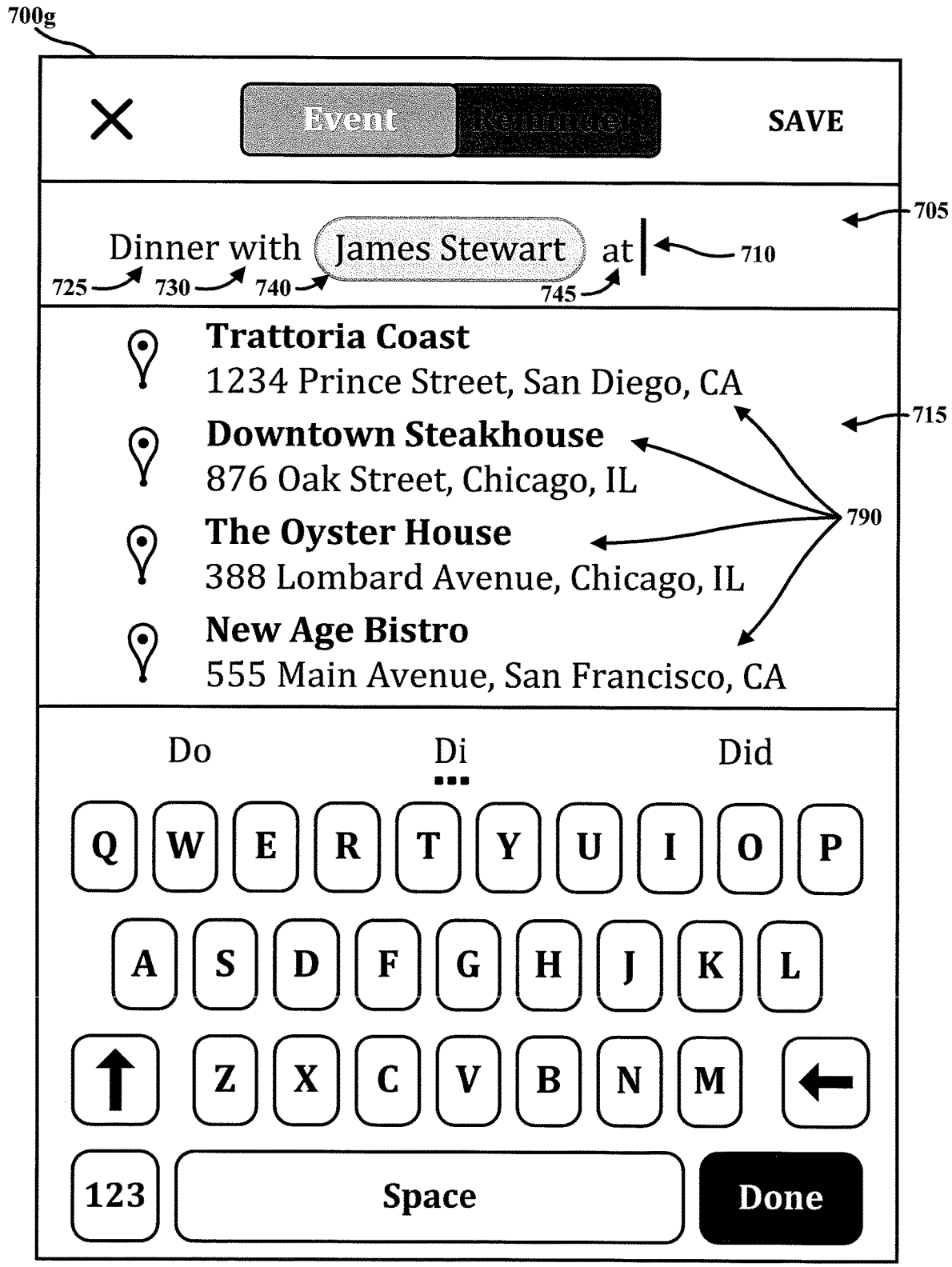
FIG. 7g is a user interface screen illustrating the example event creation field shown in FIG. 7f, where the event creation field includes the first and second selected suggestions for data about the event together with first and second selected connector terms, and suggestions for additional data about the event are provided for selection according to one or more embodiments described herein.

FIG. 7g is a user interface screen illustrating the example event creation field shown in FIG. 7f, where the event creation field includes the first and second selected suggestions for data about the event together with first and second selected connector terms, and suggestions for additional data about the event are provided for selection according to one or more embodiments described herein.

Figure 8:
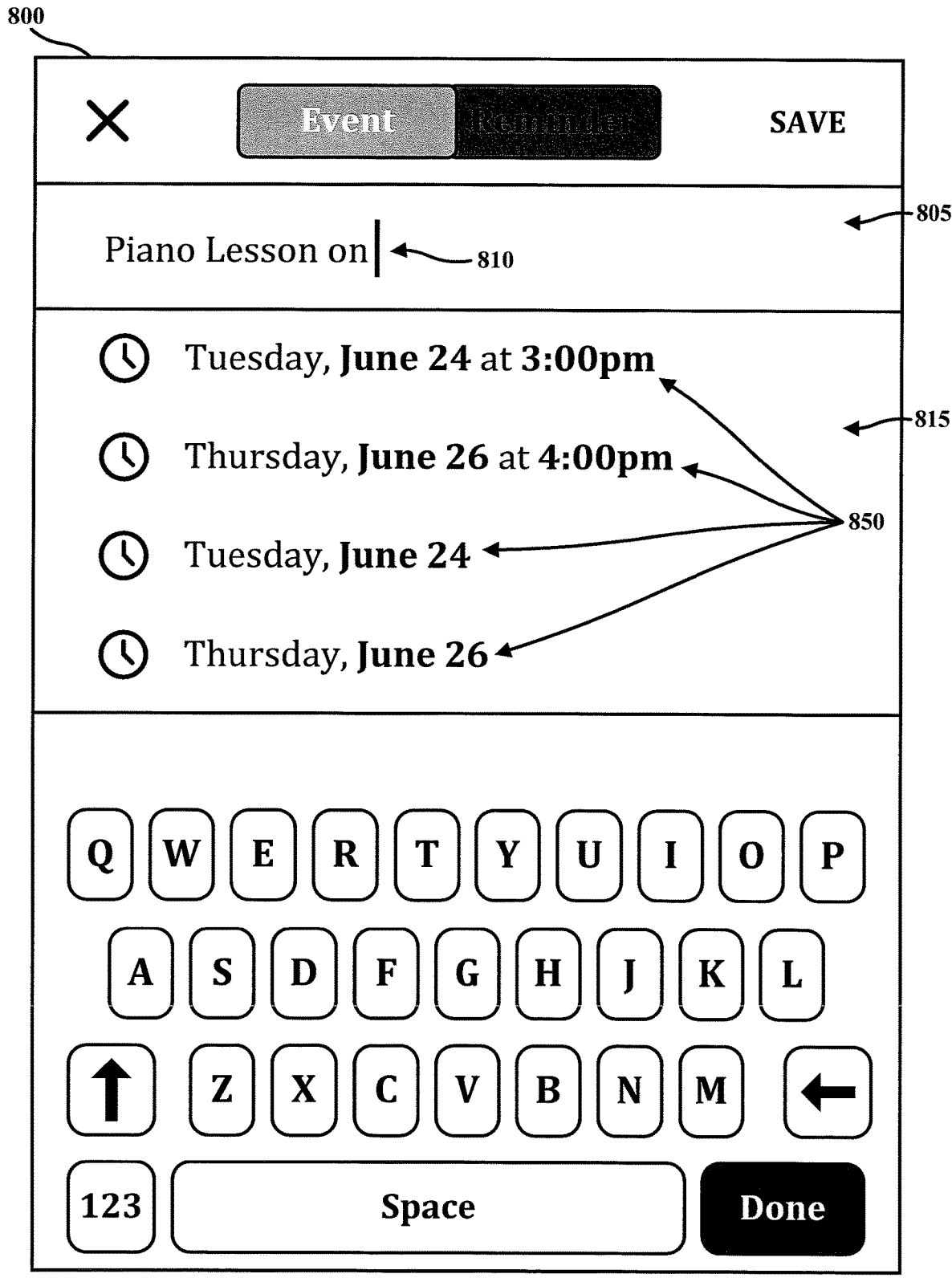
FIG. 8 is a user interface screen illustrating an example event creation field for entering data about an event, where the event creation field includes data about the event, and date and/or time suggestions for the event are provided for selection according to one or more embodiments described herein.

FIG. 8 is a user interface screen 800 illustrating an example event creation field 805 for entering data about an event, where the event creation field 805 includes data about the event, and a prompt 810 to enter additional data about the event. In the staging area 815 are provided date and/or time suggestions 850 for the event, where the date and/or time suggestions 850 may be based on the data already entered in the event creation field 805, based on data about the user's event history, or the like.

Figure 9:
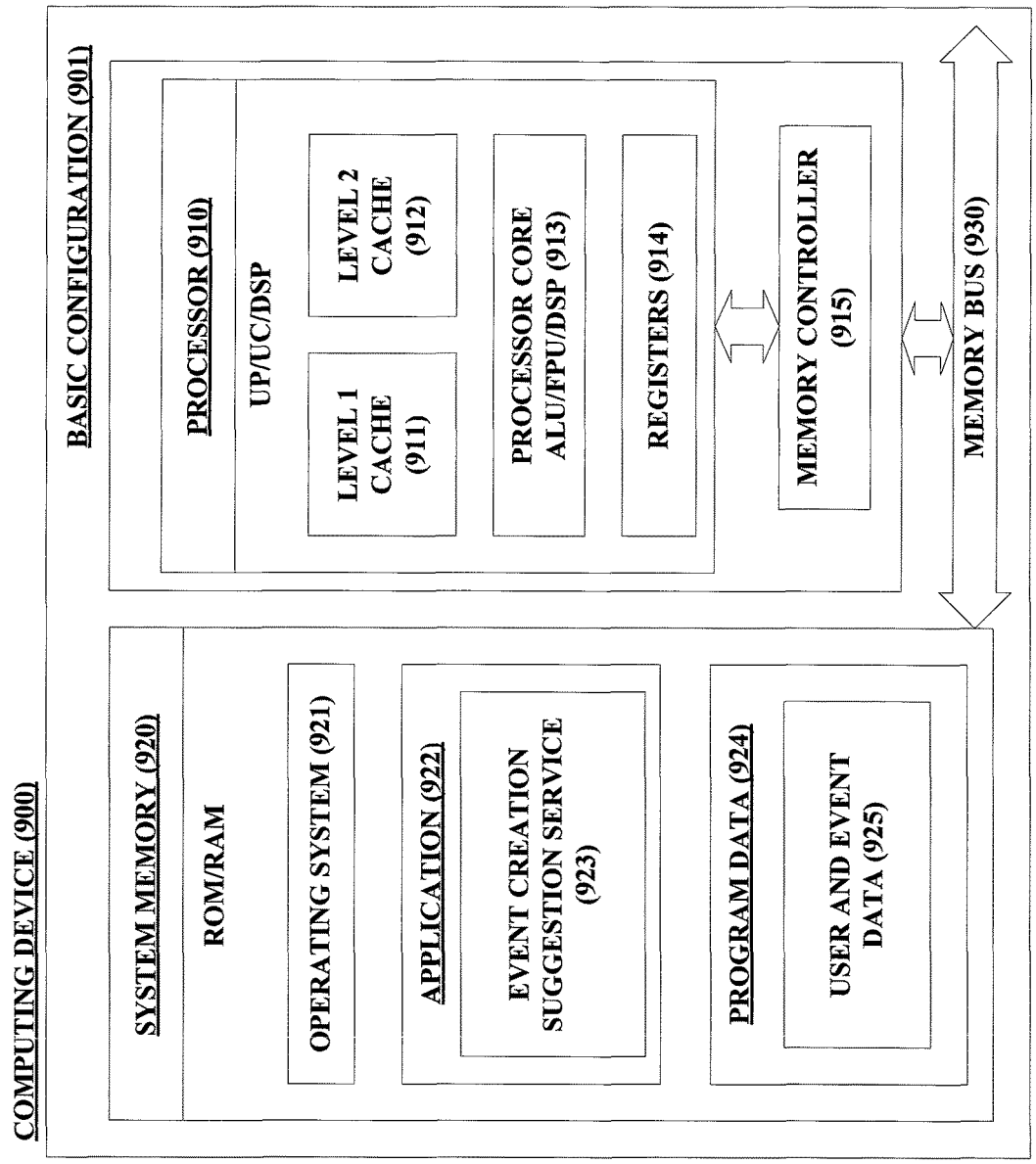
FIG. 9 is a block diagram illustrating an example computing device arranged for providing a user with an event creation suggestion service for entering details about an event according to one or more embodiments described herein.

FIG. 9 is a high-level block diagram of an exemplary computer (900) that is arranged for providing a user with an event creation suggestion service for entering details about an event according to one or more embodiments described herein. In a very basic configuration (901), the computing device (900) typically includes one or more processors (910) and system memory (920). A memory bus (930) can be used for communicating between the processor (910) and the system memory (920).

Depending on the desired configuration, the processor (910) can be of any type including but not limited to a microprocessor (µP), a microcontroller (µC), a digital signal processor (DSP), or any combination thereof. The processor (910) can include one more levels of caching, such as a level one cache (911) and a level two cache (912), a processor core (913), and registers (914). The processor core (913) can include an arithmetic logic unit (ALU), a floating point unit (FPU), a digital signal processing core (DSP Core), or any combination thereof. A memory controller (915) can also be used with the processor (910), or in some implementations the memory controller (915) can be an internal part of the processor (910).

Depending on the desired configuration, the system memory (920) can be of any type including but not limited to volatile memory (such as RAM), non-volatile memory (such as ROM, flash memory, etc.) or any combination thereof. System memory (920) typically includes an operating system (921), one or more applications (922), and program data (924). The application (922) may include a system (e.g., system 100 as shown in the example of FIG. 1) for providing event location information (923) to a user (e.g., to a user device) based on data associated with corresponding calendar events of the user (e.g., as obtained from a calendar web application utilized by the user) according to one or more embodiments described herein. Program Data (924) may include storing instructions that, when executed by the one or more processing devices, implement a system and method for providing location identification information to a user based on data associated with corresponding calendar events according to one or more embodiments described herein. Additionally, in accordance with at least one embodiment, program data (924) may include user calendar events data (925), which may relate to events scheduled in a calendar web application for the user. In some embodiments, the application (922) can be arranged to operate with program data (924) on an operating system (921).

The computing device (900) can have additional features or functionality, and additional interfaces to facilitate communications between the basic configuration (901) and any required devices and interfaces.

System memory (920) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 900. Any such computer storage media can be part of the device (900).

The computing device (900) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (900) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location).

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method for creating time-based events, the method comprising, by a computing device:
   detecting typing input from a user in an event creation field for entering data about an event;
   mining existing events to generate a pool of event suggestions, the event suggestions being based on events stored in a calendar database;
   determining a template based on the typing input in the event creation field;
   detecting the user's location using a global positioning system (GPS) associated with a device of the user;
   determining, based on the template, the user's location, and matching the typing input against the event suggestions in the pool, one or more connector terms and one or more suggestions for the data about the event;
   presenting a call-out box, that refers to the typing input and to a list box, while the event creation field displays the typing input;
   displaying a clicking prompt, the one or more connector terms, and one or more suggestions for selection within the list box while the call-out box refers to the typing input and to the list box, the clicking prompt being associated with one of the one or more connector terms and one of the one or more suggestions;
   receiving a click on the clicking prompt within the list box;
   adding the connector term and the suggestion associated with the clicked-on clicking prompt to the event creation field as the data about the event;
   presenting, within the list box, additional suggestions from the pool of event suggestions based on a type of the added connector term; and
   receiving a click indicating a suggestion of one of the additional suggestions.

2. The method of claim 1, further comprising:
   determining, based on the suggestion added to the list box, at least one other suggestion for the data about the event; and
   displaying the at least one other suggestion for selection by the user.

3. The method of claim 2, further comprising:
   receiving from the user a selection of the at least one other suggestion; and
   adding the selected at least one other suggestion to the list box as additional data about the event.

4. The method of claim 1, wherein the suggestions include one or more of:
   a title for the event,
   a location associated with the event,
   a date and/or time associated with the event, and
   a contact associated with the event.

5. The method of claim 1, wherein each of the suggestions is for one of:
   a title for the event,
   a location associated with the event,
   a date and/or time associated with the event, and
   a contact associated with the event.

6. The method of claim 1, wherein each of the one or more suggestions includes a placeholder for one of a contact associated with the event and a date and/or time associated with the event.

7. The method of claim 1, wherein each of the one or more suggestions includes a placeholder for a location associated with the event.

8. The method of claim 1, wherein the determining the template includes:
   determining that the typing input matches one or more templates for entering data about an event; and
   displaying the one or more templates for selection, wherein the one or more templates are displayed according to a rank assigned to each of the templates.

9. The method of claim 1, further comprising:
   prompting the user to enter data about a first component of the event;
   generating, based on data entered by the user, one or more suggestions for the first component of the event;
   receiving a selection of a suggestion from the one or more suggestions generated for the first component of the event;
   adding the selected suggestion as the first component of the event; and
   generating, based on the selected suggestion for the first component of the event, one or more suggestions for a second component of the event, the second component of the event being different than the first component.

10. The method of claim 9, wherein the first component and the second component are each a different one of:
    a title for the event, a location associated with the event,
a date and/or time associated with the event, and
a contact associated with the event.

11. One or more non-transitory computer readable media storing computer-executable instructions that, when executed by one or more processors, cause a computing device to perform operations comprising:
- detecting typing input from a user in an event creation field for entering data about an event;
- mining existing events to generate a pool of event suggestions, the event suggestions being based on events stored in a calendar database;
- determining a template based on the typing input in the event creation field;
- detecting the user's location using a global positioning system (GPS) associated with a device of the user;
- determining, based on the template, the user's location, and matching the typing input against the event suggestions in the pool, one or more connector terms and one or more suggestions for the data about the event;
- presenting a call-out box, that refers to the typing input and to a list box, while the event creation field displays the typing input;
- displaying a clicking prompt, the one or more connector terms, and one or more suggestions for selection within the list box while the call-out box refers to the typing input and to the list box, the clicking prompt being associated with one of the one or more connector terms and one of the one or more suggestions;
- receiving a click on the clicking prompt within the list box;
- adding the connector term and the suggestion associated with the clicked-on clicking prompt to the event creation field as the data about the event;
- presenting, within the list box, additional suggestions from the pool of event suggestions based on a type of the added connector term; and
- receiving a click indicating a suggestion of one of the additional suggestions.

* * * * *